(12) United States Patent
Ichihara et al.

(10) Patent No.: US 7,245,576 B2
(45) Date of Patent: Jul. 17, 2007

(54) OPTICAL RECORDING MEDIUM AND OPTICAL RECORDING-REPRODUCING METHOD

(75) Inventors: Katsutaro Ichihara, Yokohama (JP); Sumio Ashida, Tokyo (JP); Keiichiro Yusu, Yokohama (JP); Kenji Todori, Yokohama (JP); Takayuki Tsukamoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 737 days.

(21) Appl. No.: 10/758,481

(22) Filed: Jan. 16, 2004

(65) Prior Publication Data

US 2004/0190432 A1 Sep. 30, 2004

(30) Foreign Application Priority Data

Jan. 20, 2003 (JP) .............................. 2003-011174

(51) Int. Cl.
*G11B 7/24* (2006.01)

(52) U.S. Cl. .................................... 369/275.1; 369/53.1

(58) Field of Classification Search .. 369/275.1–275.5, 369/116, 53.1, 53.11, 59.24, 47.14, 44.39, 369/47.53, 283–284, 288, 277, 13.07
See application file for complete search history.

(56) References Cited

U.S. PATENT DOCUMENTS 6,122,228 A 9/2000 Shimazaki et al.
6,187,406 B1 2/2001 Ichihara et al.
7,142,496 B2 * 11/2006 Miyagawa et al. ...... 369/59.11

FOREIGN PATENT DOCUMENTS

JP 9-134546 5/1997
JP 10-40576 2/1998

* cited by examiner

*Primary Examiner*—Ali Neyzari
(74) *Attorney, Agent, or Firm*—Oblon, Spivak, McClelland, Maier & Neustadt, P.C.

(57) ABSTRACT

An optical recording medium includes an optical recording layer, a separating layer formed on a reproducing light incident side of the optical recording layer, and a phase-change reproducing layer formed on the reproducing light incident side of the separating layer, absorbance of which phase-change reproducing layer is changed depending on whether a state of the optical recording layer is a recording mark or a space. A transfer portion to which a state of the optical recording layer is transferred is formed in a portion having high absorbance of the phase-change reproducing layer by irradiation with reproducing light, while a portion of the phase-change reproducing layer other than the transfer portion is kept in a state optically differing from the transfer portion.

22 Claims, 10 Drawing Sheets

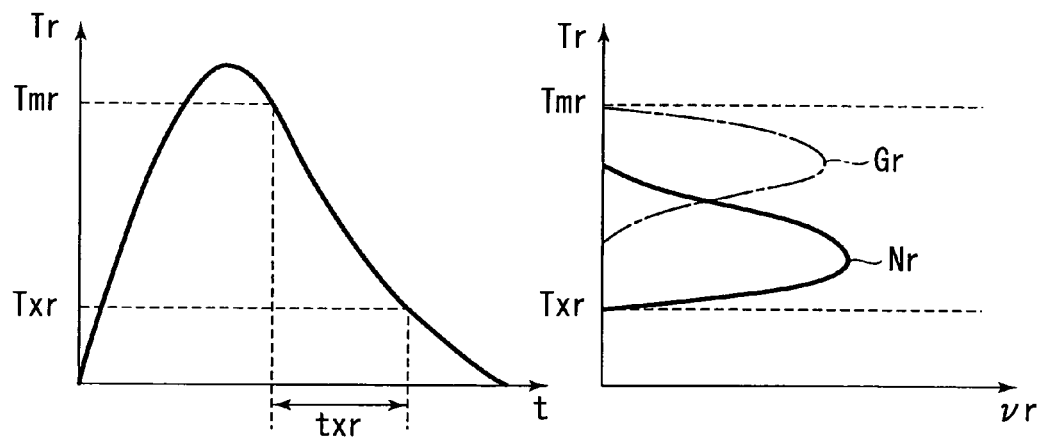
FIG. 6   FIG. 7
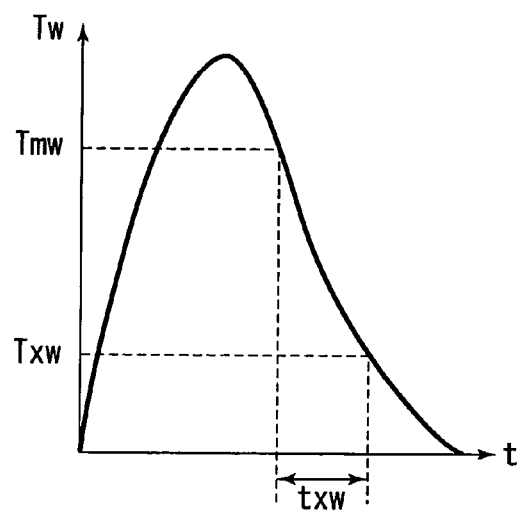   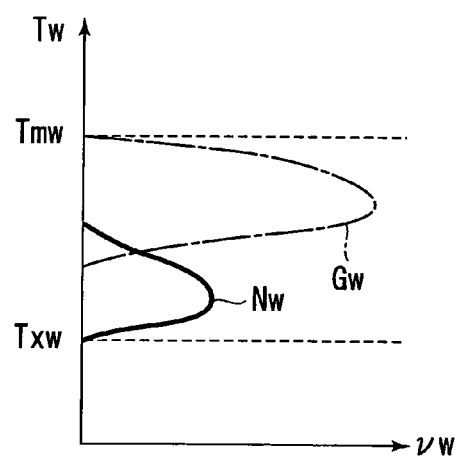
FIG. 12   FIG. 13

OPTICAL RECORDING MEDIUM AND OPTICAL RECORDING-REPRODUCING METHOD

CROSS-REFERENCE TO RELATED APPLICATIONS

This application is based upon and claims the benefit of priority from the prior Japanese Patent Application No. 2003-11174, filed Jan. 20, 2003, the entire contents of which are incorporated herein by reference.

BACKGROUND OF THE INVENTION

1. Field of the Invention

The present invention relates to an optical recording medium and an optical recording-reproducing method for reproducing information or recording-reproducing information by irradiation with a light beam, particularly, to a technology for improving recording density.

2. Description of the Related Art

Optical disc memories for reproducing information or for recording-reproducing information by irradiation with a light beam have been widely put to practical use for recording, reproducing and storing audio signals, video signals and computer data as a recording apparatus having high capacity, capable of high-speed access, and portability, and such optical disc memories are expected to be further improved in the future for high recording density (high recording capacity) and high-speed operation.

The recording density of an optical disc can be increased by various approaches including, for example, use of a mastering laser beam having a shorter wavelength, use of a light source mounted in the apparatus, i.e., a semiconductor laser in general, having a shorter wavelength, increase in the numerical aperture of an objective lens, hereinafter referred to as the NA, decrease in the thickness of a substrate (or a cover layer) on the light incident side, mark length recording, land-groove recording and improvements in modulation-demodulation system.

In addition to the approaches exemplified above, proposed is super-resolution reproduction technology utilizing recording medium films that produces a high effect of increasing the recording density. The super-resolution reproduction technology was proposed initially with respect to the magneto-optical disc (MOD). In the super-resolution reproduction technology, a reproducing layer is magnetically coupled with the recording layer by means of exchange coupling or magnetostatic coupling, in which an optical aperture smaller than a reproduction spot is formed in the reproducing layer by utilizing heating achieved by irradiation with reproducing light and change in temperature caused by the exchange force or the magnetostatic force between the layers. The above super-resolution reproduction technology, which utilizes in principle the magnetic interaction between the layers, was considered to be high-density technology inherent in MOD.

An attempt to form a super-resolution reproducing layer, in which an optical constant is non-linearly changed upon irradiation with reproducing light, on the light incident side of the recording layer was reported later in respect of a read-only disc (ROM). Since it is possible in principle to apply the method to not only MODs and ROMs but also to phase-change recording discs (PCD) and write-once discs (R or WO) typically having a dye recording layer, various proposals have been made to date in respect of the super-resolution reproduction medium using a nonlinear optical film. The technology, called super-RENS (super-resolution near-field structure), belongs to the super-resolution medium technology.

In the conventional super-resolution reproduction technology using a nonlinear optical film, proposed are a heat mode nonlinear optical film represented by Sb, $Sb_2Te_3$, Te, Ge—Sb—Te, or $AgO_x$ and a photon mode nonlinear optical film represented by a photochromic film or a semiconductor fine particle dispersed film.

All of the conventional super-resolution reproduction technologies using these nonlinear optical films utilize an optical response of the nonlinear optical film alone. In the conventional super-resolution reproduction technology, the nonlinear optical film was non-linearly changed continuously during irradiation with the reproducing light so as to perform the reproducing operation while reducing the reproducing spot size. In the conventional super-resolution reproduction technology, however, load applied to the nonlinear optical film is high, making it difficult to obtain a practical number of repetitions for reproduction.

BRIEF SUMMARY OF THE INVENTION

An object of the present invention is to provide an optical recording medium which permits reproduction of a recording mark smaller than an optical limit so as to achieve high recording density and which also permits increasing the number of repetitions for reproduction.

According to an aspect of the present invention, there is provided an optical recording medium, comprising: an optical recording layer; a separating layer formed on a reproducing light incident side of the optical recording layer; and a phase-change reproducing layer formed on the reproducing light incident side of the separating layer, absorbance of which phase-change reproducing layer is changed depending on whether a state of the optical recording layer is a recording mark or a space, wherein a transfer portion to which a state of the optical recording layer is transferred is formed in a portion having high absorbance of the phase-change reproducing layer by irradiation with reproducing light, while a portion of the phase-change reproducing layer other than the transfer portion is kept in a state optically differing from the transfer portion.

According to another aspect of the present invention, there is provided an optical recording medium, comprising: an optical recording layer; a separating layer formed on a reproducing light incident side of the optical recording layer; and a phase-change reproducing layer formed on the reproducing light incident side of the separating layer, absorbance of which phase-change reproducing layer is changed depending on whether a state of the optical recording layer is a recording mark or a space, wherein a reverse transfer portion to which a state of the optical recording layer is reversely transferred is formed in a portion having high absorbance of the phase-change reproducing layer by irradiation with reproducing light, while a portion of the reproducing layer other than the reverse transfer portion is kept in a state optically differing from the reverse transfer portion.

According to still another aspect of the present invention, there is provided an optical recording medium, comprising: a transparent substrate having a pit train as an optical recording layer formed on a surface thereof; and a phase-change reproducing layer formed on the transparent substrate, absorbance of which phase-change reproducing layer is changed depending on whether a state of the optical recording layer is a recording mark or a space, wherein a transfer portion to which a state of the optical recording layer is transferred is formed in a portion having high absorbance of the phase-change reproducing layer by irradiation with reproducing light, while a portion of the phase-change reproducing layer other than the transfer portion is kept in a state optically differing from the transfer portion.

According to yet another aspect of the present invention, there is provided an optical recording medium, comprising: a transparent substrate having a pit train as an optical recording layer formed on a surface thereof; and a phase-change reproducing layer formed on the transparent substrate, absorbance of which phase-change reproducing layer is changed depending on whether a state of the optical recording layer is a recording mark or a space, wherein a reverse transfer portion to which a state of the optical recording layer is reversely transferred is formed in a portion having high absorbance of the phase-change reproducing layer by irradiation with reproducing light, while a portion of the reproducing layer other than the reverse transfer portion is kept in a state optically differing from the reverse transfer portion.

According to yet another aspect of the present invention, there is provided an optical recording-reproducing method, comprising: irradiating any of the afore-mentioned optical recording medium with reproducing light; transferring or reversely transferring a recording mark or a space of the recording layer to the phase-change reproducing layer heated to a temperature not lower than a melting point or a crystallizing temperature by irradiation with the reproducing light to form a transfer portion or a reverse transfer portion; and detecting reflected light from the transfer portion or the reverse transfer portion to perform reproduction.

BRIEF DESCRIPTION OF THE SEVERAL VIEWS OF THE DRAWING

FIG. 6 is a graph exemplifying temperature hysteresis in the transfer process of the phase-change reproducing layer according to an embodiment of the present invention;

FIG. 7 is a graph exemplifying the frequency function of crystal growth and the frequency function of crystal nucleus formation in the phase-change reproducing layer according to an embodiment of the present invention;

FIG. 12 is a graph exemplifying temperature hysteresis of the recording layer according to an embodiment of the present invention;

FIG. 13 is a graph exemplifying the frequency function of crystal growth and the frequency function of crystal nucleus formation in the recording layer according to an embodiment of the present invention;

DETAILED DESCRIPTION OF THE INVENTION

Embodiments of the present invention will now be described with reference to the accompanying drawings and Tables. To facilitate understanding of the present invention, the embodiments of the present invention will be described in the order of (1) the example of the basic construction of the optical recording medium of the present invention, (2) the principle of the typical transfer reproduction, (3) the principle of the typical magnified transfer reproduction, (4) modifications of the transfer reproduction process and the magnified transfer reproduction process, (5) the principle of the recording, (6) examples of the film materials and the deposition method, which can be employed in the optical recording medium of the present invention, and (7) the basic construction of the optical recording-reproducing apparatus according to an embodiment of the present invention.

Figure 1A:
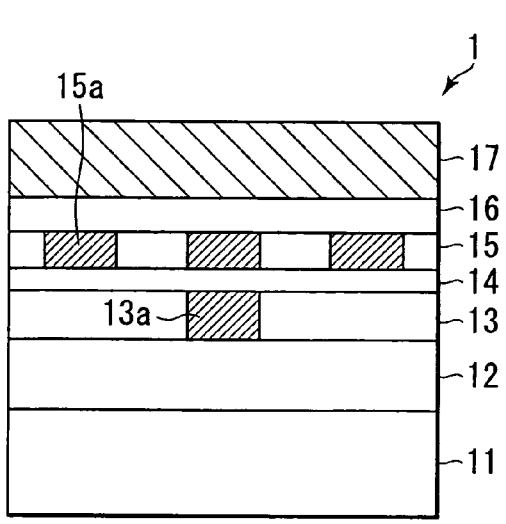
FIG. 1A is a cross-sectional view schematically showing the construction of an optical recording medium according to an embodiment of the present invention.
Figure 1B:
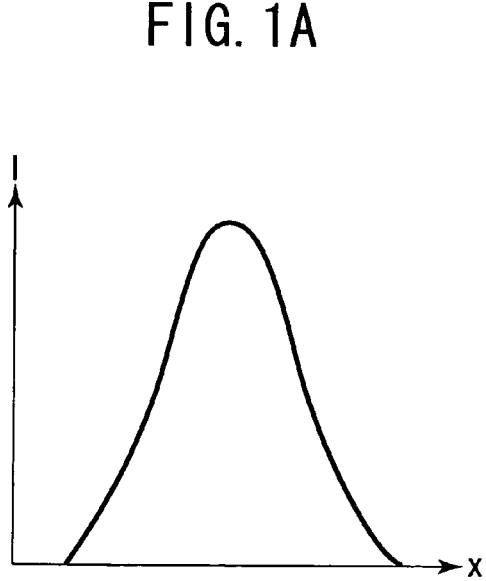
FIG. 1B is a graph showing intensity distribution of reproducing light.
Figure 3A:
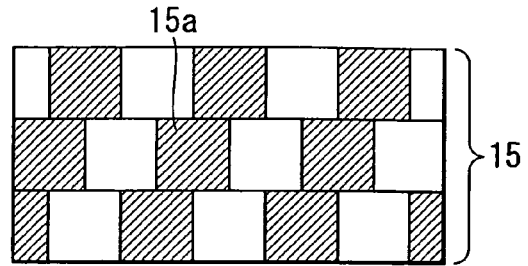
FIGS. 3A to 3E show the principle of transfer reproduction according to an embodiment of the present invention.
Figure 3B:
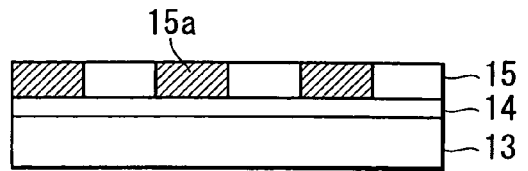
Figure 3C:
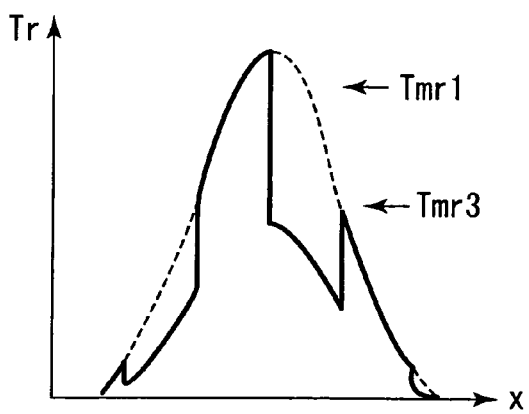
Figure 3D:
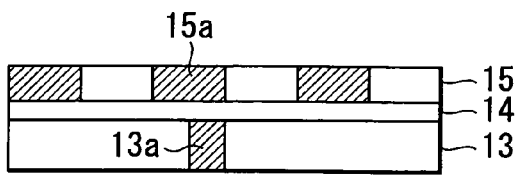
Figure 3E:
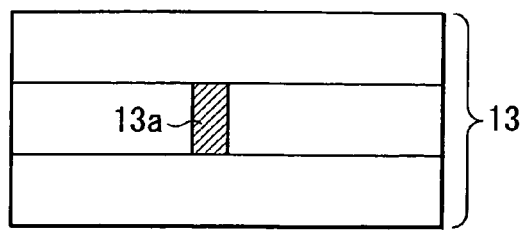

(1) Basic Construction of the Optical Recording Medium of the Present Invention:

FIG. 1A is a cross-sectional view schematically showing the basic construction of the optical recording medium 1 according to an embodiment of the present invention, and FIG. 1B is a graph showing intensity distribution of reproducing light.

The optical recording medium 1 shown in FIG. 1A comprises a substrate (or a cover layer) 11 and a stacked structure including a first interference layer 12, a phase-change reproducing layer 13, a separating layer 14, an optical recording layer 15, a second interference layer 16 and a heat control layer 17, which are stacked in the order mentioned on the substrate 11. Light is incident on the substrate (or the cover layer) 11. It should be noted that the phase-change reproducing layer 13 is formed on the light incident side of the optical recording layer 15 with the separating layer 14 interposed therebetween.

The optical recording layer 15 has recording marks formed therein by irradiation with light so as to perform the function of recording and storing information. The phase-change reproducing layer 13 performs the function of transferring the recording marks (or the space between the recording marks) formed in the optical recording layer in the reproducing stage. FIG. 1A shows a state that recording marks 15a are formed in the optical recording layer 15, and the recording marks 15a formed in the optical recording layer 15 are partly transferred to the phase-change reproducing layer 13 so as to form a transfer mark 13a.

In the case of employing a layer other than ROM or a magneto-optical recording layer for the optical recording layer, the separating layer 14 is formed. The separating layer 14 performs the function of preventing the reproducing layer 13 and the optical recording layer 15 from being mixed by melting or diffusion. In addition, the separating layer 14 performs the function of controlling the reflectance and the absorbance of the reproducing layer 13 and the absorbance of the recording layer 15 and the function of controlling the thermal response of the reproducing layer 13 and the optical recording layer 15.

The first interference layer 12 and the second interference layer 16 perform the function of controlling the reflectance and the absorbance of the reproducing layer and the absorbance of the recording layer and also performs the function of controlling the thermal response of each of the reproducing layer and the recording layer.

The heat control layer 17 mainly performs the function of controlling the thermal response of the recording layer. In addition, the heat control layer 17 performs the function of improving the efficiency of utilizing the light (reflection function) in the case where the total thickness of the reproducing layer and the recording layer is small so as to permit the transmission of the light to the side of the heat control layer. Further, the heat control layer 17 performs the function of controlling the reflectance and the absorbance of the reproducing layer and the absorbance of the recording layer and also performs the function of controlling the thermal response of each of the reproducing layer and the recording layer like the first interference layer, the second interference layer and the separating layer.

The substrate 11 performs the function of mechanically holding each of the layers made of thin films, and the function of protecting each of the layers from the dust in the operating environment and from the fingerprint attached during the medium operation. Also, where header signals and tracking guide grooves are pre-formatted in the substrate 11, the substrate 11 performs the function of generating header signals (such as address signals and various control signals) and tracking signals. In this case, the various layers are generally formed upward in FIG. 1A on the substrate 11 starting with the first interference layer 12.

In the case of using a cover layer, the cover layer performs the function of mechanically holding each of the layers made of thin films and the function of protecting each of the layers from dust in the operating environment and fingerprints that adhere during manipulation of the medium. In the case of using the cover layer, it is possible for header signals and tracking signals to be pre-formatted on the cover layer. Alternatively, it is possible to dispose a substrate (not shown) having the header signals and the tracking signals pre-formatted thereon on the heat control layer 17. In the case of disposing a pre-formatted substrate on the heat control layer 17, the layers constituting the stacked structure are formed downward in FIG. 1A on the substrate (not shown) starting with the heat control layer 17.

The material, the thickness and the deposition method of each of the layers will be described in detail in item (4) referred to hereinafter.

FIG. 1B is a graph showing the intensity distribution of the reproduced laser light. The light intensity I is plotted on the ordinate and the position x in the track direction is plotted on the abscissa in the graph shown in FIG. 1B. The graph of FIG. 1B is depicted with the highest intensity on the x-axis set at eE-2. This is also the case with the graphs shown in FIG. 2C and so on. The intensity distribution of the reproducing light substantially represents Gaussian distribution and, thus, is in symmetry with respect to an axis. In other words, even if x is rotated by 360° in the plane of the medium film, the intensity distribution is rendered equal to that shown in FIG. 1B.

(2) Principle of Typical Transfer Reproduction in the Present Invention:

( 2-1. Typical Example of the Transfer Reproduction Process)

FIGS. 2-5 are intended to explain the typical principle of the transfer reproduction process in the present invention. In each of FIGS. 2 to 5, only the reproducing layer 13, the separating layer 14 and the optical recording layer 15 of the recording medium 1 are depicted.

FIGS. 2-5 show the changes with time in the states of the recording medium, covering the case where the medium is moved from the right to the left relative to the reproducing beam. To be more specific, FIG. 2 shows the state at time t1, FIG. 3 shows the state at time t2, FIG. 4 shows the state at time t3, and FIG. 5 shows the state at time t4. Times t1 to t4 are as follows:

t1: The time when the center of the reproducing beam is substantially in the center of the recording mark.

t2: The time when the recording medium is moved to the left by substantially half the mark length (substantially equal to the space length) relative to the reproducing beam.

t3, t4: The time when the recording medium is further moved to the left successively by substantially half the mark length relative to the reproducing beam.

If recording marks are consecutively recorded in a close-packed pattern in the track to be reproduced, when the recording medium is further moved from time t4 to the left by substantially half the mark length relative to the reproducing beam, the state is brought to the state equal to that at time t1, and the operation described above is repeated. In the transfer reproduction principle of the present invention, it suffices to describe the case where the close-packed pattern is recorded in the track to be reproduced because the similar transfer reproduction can be apparently be achieved in respect of a pattern longer than the close-packed pattern. Such being the situation, the following description covers the case where the close-packed pattern is reproduced.

The capital letters A to E in each of FIGS. 2 to 5 denote the situations given below:

Specifically, FIGS. 2A to 5A are plan views each showing the optical recording layer 15 as viewed from the side opposite to the light incident side, i.e., as viewed from the upper side.

FIGS. 2B to 5B are cross-sectional views each directed to the main portion of the recording medium and showing the state before the transfer operation.

FIGS. 2C to 5C are graphs each showing the temperature distribution of the reproducing layer 13.

FIGS. 2D to 5D are cross-sectional views each directed to the main portion of the recording medium and showing the state after the transfer operation.

Further, FIGS. 2E to 5E are plan views showing the recording medium after the transfer operation as viewed from the side of the reproducing layer 13, i.e., as viewed from the lower side.

In each of FIGS. 2A to 5A and 2B to 5B, the hatched portion in the optical recording layer 15 denotes the recording mark 15a, and the blank portion denotes the space. The mark and the space are shaped rectangular and have the same size in the drawing. The actual shape of the mark is dependent on the profile (generally Gaussian type) of the recording beam and the write strategy such that the actual mark is shaped circular, semi-circular, and elliptical or is shaped like a herringbone. It should be noted in this connection that an accurate shape of the recording mark is not needed in describing the principle of the present invention and, thus, the recording mark is shaped rectangularly in each of FIGS. 2A to 5A. Here, the scale of the x-axis is not equal to the scale of the y-axis. It is desirable for the track pitch to be set longer than the shortest mark length.

Since the recording medium is irradiated in general with the recording light by using the optical system equal to that of the reproducing light, it is reasonable to understand that the spatial distribution of the recording light is equal to the spatial distribution of the reproducing light shown in FIG. 1B and differs in the intensity alone from that of the reproducing light. What is most desirable for simplifying the optical system in the present invention is the mode that the recording light and the reproducing light are equal to each other in spatial distribution. It should be noted, however, that the present invention could be worked even if the spatial distribution of the recording light differs from the spatial distribution of the reproducing light. Particularly, where the size of the recording spot is smaller than that of the reproducing spot, it is possible to easily record the mark and the space smaller than the resolution of the reproducing light, which is advantageous for working the present invention.

Each of FIGS. 2A to 5A shows three tracks including the track to be reproduced $tr_n$ and adjacent tracks $tr_{n-1}$ and $tr_{n+1}$ positioned on both sides of the track $tr_n$. Also, each of FIGS. 2A to 5A shows the state that the marks and the spaces of the same size are recorded in each track. The mark and the space in the optical recording layer 15 correspond to the close-packed pattern of the random data used in the recording stage of, for example, the actual user data. Here, FIGS. 2B to 5B are cross-sectional views of the tracks $tr_n$ to be reproduced shown in the center in FIGS. 2A to 5A, respectively, along the track direction. Also, in FIGS. 2A to 5A, the marks on the adjacent tracks are formed contiguous to each other. However, a space is formed in general between the adjacent tracks. It should be noted, however, that, since the space between the adjacent tracks need not be shown for explaining the principle of the present invention, the space between the adjacent tracks is omitted in the drawings.

Figure 2A:
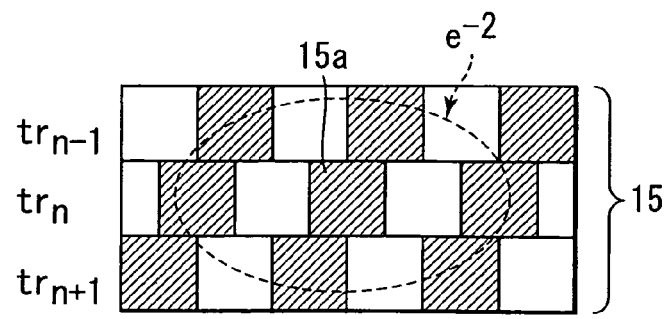
FIGS. 2A to 2E show the principle of transfer reproduction according to an embodiment of the present invention.
Figure 2B:
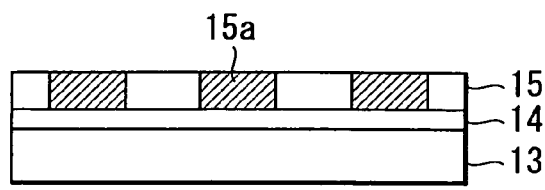
Figure 2C:
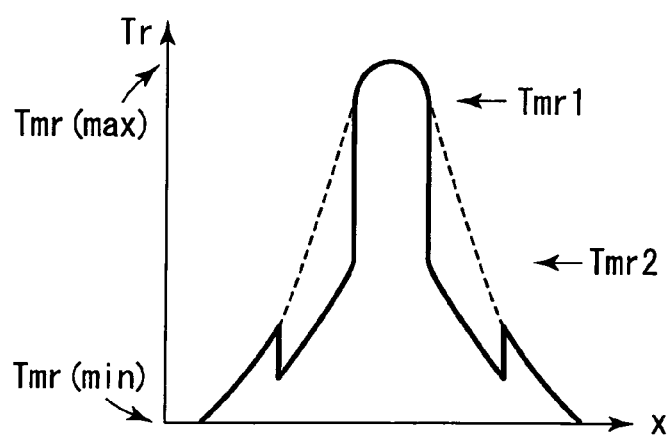

The eE-2 diameter of the reproducing spot is depicted by means of a broken line in FIG. 2A. The actual spot is substantially circular. However, since the x-axis and the y-axis differ from each other in the scale, the reproducing spot is shown elliptical in FIG. 2A. As apparent from FIG. 2A, a plurality of marks and spaces are included in the reproducing beam in each of the track direction and the track width direction. Therefore, in the recording medium that does not include a phase-change reproducing layer, inter-symbol interference and cross talk are rendered prominent so as to make it impossible to perform significant reproduction operation.

It should be noted that the reproduction limit is theoretically given by $\lambda/(2NA)$, where $\lambda$ represents the reproducing wavelength, and NA denotes the numerical aperture of the objective lens. The reproduction limit indicates that the significant reproduction signal amplitude could not be provided if the sum of the close-packed mark length and the close-packed space length reach this value. It follows that the recording pattern of the size smaller than the reproduction limit, i.e., the recording pattern formed of the marks and spaces sized smaller than the reproduction resolution, could not be reproduced significantly because of the influences given by the inter-symbol interference and the cross talk. It should be noted that the size of the reproducing laser spot, i.e., the diameter of the portion having eE-2 intensity to the central intensity, is given by about $0.8 \times \lambda/(NA)$. In the case of using an optical recording-reproducing apparatus having, for example, $\lambda$ of 413 nm and NA of 0.65 as in the Examples described hereinafter, the reproduction limit is 318 nm and the eE-2 diameter is about 500 nm. Since the length in the track direction of the recording mark and the space and the distance between the adjacent tracks shown in each of FIGS. 2A to 5A and 2B to 5B is assumed to be about 100 nm, the sum of the recording mark length and the space length in the track direction is about 200 nm. This value is markedly smaller than the reproduction limit of 318 nm given above. It follows that in the conventional recording medium that does not include the phase-change reproducing layer, it is impossible to reproduce significantly the recording pattern shown in each of FIGS. 2 to 5.

In the present invention, the mark or the space alone in the recording layer is transferred to the phase-change reproducing layer (in the ideal case, a single mark or space alone being transferred), and the transferred mark or space is reproduced. Therefore, it is possible to reproduce even the recording pattern smaller than the reproduction limit.

Incidentally, the track pitch is seen to be about 100 nm in FIGS. 2 to 5. However, since the scale of the x-axis is not equal to the scale of the y-axis as described previously, the track pitch on the drawing is about 200 nm. However, in view of the cross erase (the phenomenon that the mark edge portion on the adjacent tracks is erased in recording the mark), it is desirable to set the track pitch at a value not smaller than $\lambda/(2NA)$, and it is more desirable to set the track pitch at a value not smaller than the full width at half maximum (FWHM).

In each of FIGS. 2D to 5D and 2E to 5E, the hatched portion in the optical recording layer 15 denotes a mark, the blank portion denotes a space, and the hatched portion in the reproducing layer 13 denotes a transfer mark 13 a transferred to the reproducing layer. The initial state of the phase-change reproducing layer (the state before the transfer) is a crystalline state.

As described previously, each of FIGS. 2C to 5C is a graph schematically showing the temperature distribution of the reproducing layer 13 in the stage of the irradiation with the reproducing light. The broken line in each of FIGS. 2C to 5C corresponds to the temperature distribution of the reproducing light. The actual temperature distribution is widened on the downstream side in the moving direction of the recording medium (to the right in the drawing) because of the limited thermal response time and the movement of the recording medium. Therefore, strictly speaking, it is necessary to determine the actual temperature distribution by solving a thermal conduction equation in view of the thermal diffusion in the in-plane direction and the thickness direction of the film. It should be noted, however, that since it is unnecessary to know strictly the temperature distribution in the reproducing layer in describing the basic principle of the present invention, the temperature distribution of the reproducing layer, which is determined by the intensity distribution of the reproducing light and the absorbance of the reproducing layer, is shown in each of FIGS. 2C to 5C.

The present invention is featured in that the absorbance of the phase-change reproducing layer is changed depending on whether the state of the recording layer is the mark or the space. In the present invention, the transfer reproduction is realized on the principle that the mark or the space in the recording layer is selectively transferred to the reproducing layer by the absorbance difference in the reproducing layer. A typical example of the transfer reproduction will now be described.

In FIGS. 2 to 5, the absorbance of the phase-change reproducing layer before, for example, the transfer operation is adjusted such that the absorbance at the time when the state of the recording layer is a mark is substantially twice the absorbance at the time when the state of the recording layer is a space. As described previously under item (1), it is possible to control the absorbance of the reproducing layer over a wide range depending on the material, the deposition conditions (selection of the complex refractive index relative to the operating wavelength), and the thickness of the first interference layer 12, the separating layer 14, the second interference layer 16, the heat control layer 17, the phase-change reproducing layer 13 and the optical recording layer 15. Also, as described hereinafter, it is possible to form the first interference layer, the separating layer, the second interference layer and the heat control layer by stacking film materials differing from each other in the refractive index. It is also possible to form a layer of a semi-absorptive material within the interference layer and the separating layer. It is also possible to form a transparent layer within the heat control layer. Thus, it is possible to control the absorbance of the phase-change reproducing layer over a wide range by selecting appropriately the construction of the stacked structure, the material and the thickness of each layer.

When it comes to the principle of the typical transfer reproduction shown in FIGS. 2 to 5, the absorbance of the phase-change reproducing layer before the transfer operation is controlled such that the absorbance at the time when the state of the recording layer is a mark is substantially twice the absorbance at the time when the state of the recording layer is a space, as described previously. It follows that the temperature distribution in the reproducing layer at time t1 is as shown in FIG. 2C immediately before the transfer operation. Specifically, at time t1 when the center of the reproducing spot is in the vicinity of the center of the recording mark, it is possible to control such that the temperature is high in only that portion of the phase-change reproducing layer corresponding to the recording mark and is low in that portion of the phase-change reproducing layer corresponding to the space. Here, the phase-change temperature in the reproducing layer is set at the melting point (Tmr).

Figure 2D:
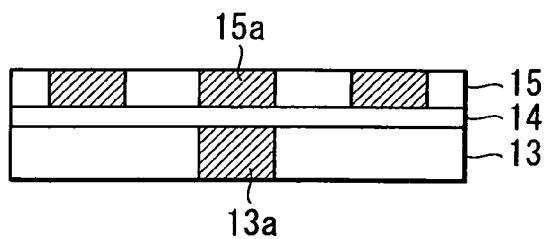
Figure 2E:
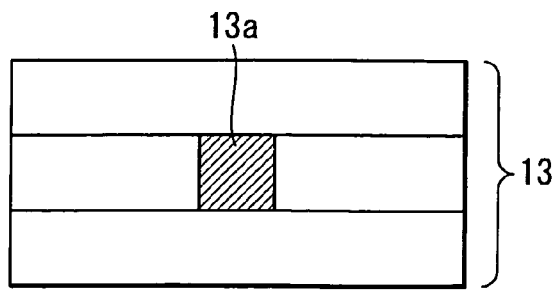
Figure 4A:
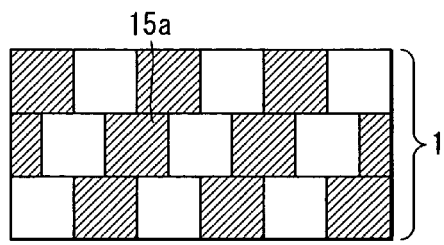
FIGS. 4A to 4E show the principle of transfer reproduction according to an embodiment of the present invention.
Figure 5A:
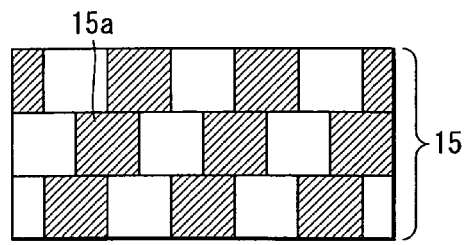
FIGS. 5A to 5E show the principle of transfer reproduction according to an embodiment of the present invention.
Figure 4B:
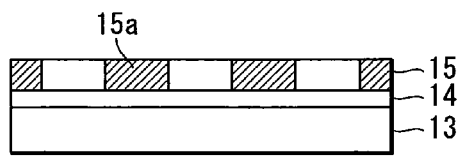
Figure 5B:
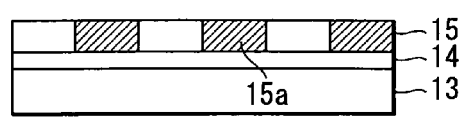
Figure 4C:
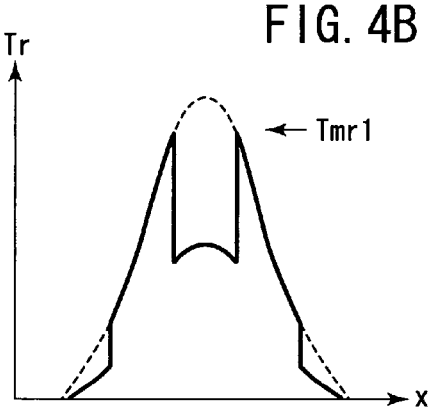
Figure 5C:
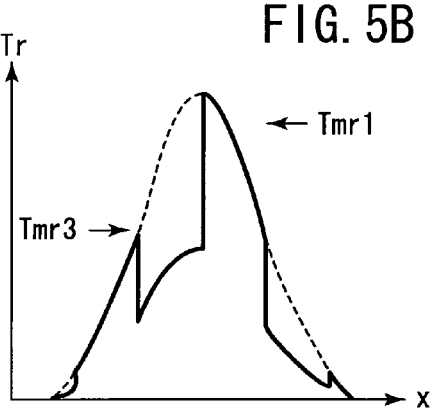
Figure 4D:
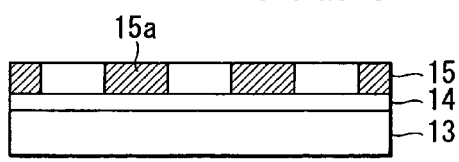
Figure 5D:
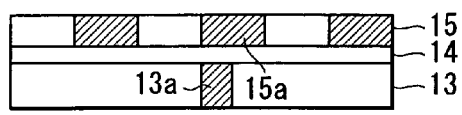
Figure 4E:
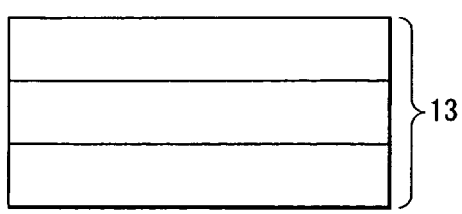
Figure 5E:
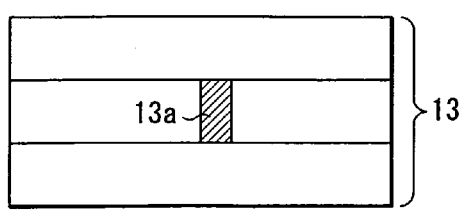

That portion of the reproducing layer heated to a temperature higher than the melting point Tmr is melted so as to exhibit an optical response differing from the surrounding portion in a crystalline state, with the result that it is possible to perform the transfer reproduction. It is possible to set the melting point Tmr to fall within a wide range by selecting appropriately the material and the deposition method of the reproducing layer, as described hereinafter. The melting point Tmr that permits at least the effect of the present invention to be produced falls within a range of between Tmr(min) and Tmr(max) shown in FIG. 2C. The temperature Tmr(min) corresponds to the eE-2 intensity of the reproducing spot. If the melting point Tmr is not lower than the temperature Tmr(min), the adjacent mark edge portion on the same track and the mark edge portion on the adjacent track are not transferred, with the result that the effect of the present invention are produced, even though it may be slightly, compared with the conventional recording medium. On the other hand, the temperature Tmr(max) corresponds to the highest temperature of the reproducing layer in the reproducing stage. Where the melting point Tmr is equal to the temperature Tmr(max), that portion alone which is in the vicinity of the center of the mark of the recording layer is transferred to the reproducing layer. In this case, the size of the transfer mark is smaller than the size of the recording mark and, thus, it is possible in principle to produce the effect of the present invention, though the amplitude of the reproduction signal is low. Where the recording mark is transferred as in FIGS. 2 to 5, it is desirable for the melting point Tmr to be set to fall within a range of between Tmr1 and Tmr2 shown in FIG. 2C. If the melting point Tmr is set in this fashion, a mark of a size equal to that of the mark in the recording layer is transferred to the reproducing layer. The particular situation is as shown in FIGS. 2D and 2E. It should be noted that only one mark in the center of the reproducing beam is transferred to the reproducing layer in spite of the situation that the reproducing spot itself includes a plurality of marks and spaces in the recording layer. It follows that the reproducing operation can be performed significantly while avoiding the inter-symbol interference and the cross talk.

FIGS. 3A to 3E show the situation of the transfer at time t2 when the recording medium is further moved from time t1 to the left relative to the reproducing spot by substantially half the mark so as to allow the center of the reproducing beam to coincide substantially with the boundary portion between the mark and the space of the recording layer. In this case, a single mark is transferred to the reproducing layer even if the melting point Tmr is set at a level not lower than Tmr 3 and not higher than Tmr1 so as to make it possible to perform significant reproduction.

FIGS. 4A to 4E show the situation of the transfer at time t3 when the recording medium is further moved from time t2 to the left by substantially half the mark so as to allow the center of the reproducing beam to coincide substantially with the center of the space of the recording layer. In this case, the mark adjacent to the space that is to be reproduced is not transferred at all, if the melting point Tmr is set at Tmr1 shown in FIG. 4C. If the temperature Tmr2 or the temperature Tmr3 is selected as the melting point Tmr, the adjacent mark is partly transferred to the reproducing layer. However, where the transfer portion is sufficiently small and the amplitude of the reproduction signal is not greatly impaired, it is possible to set the melting point Tmr at a level lower than the temperature Tmr1, e.g., at Tmr2 or Tmr3. In this typical example, it is most desirable for the melting point Tmr to be set at the temperature Tmr1.

FIGS. 5A to 5E show the situation of the transfer at time t4 when the recording medium is further moved from time t3 to the left by substantially half the mark so as to allow the center of the reproducing beam to coincide substantially with the boundary portion between the mark and the space of the recording layer. In this case, the situation of the transfer is substantially equal to that shown in FIGS. 3A to 3E.

The principle of the typical transfer reproduction in the present invention is as described above. In the embodiment of the present invention, it is an important condition that the mark or space, once transferred, could be restored to the state before the transfer after removal of the reproducing beam. If the particular condition fails to be satisfied, a transfer mark train would remain, with the result that it is impossible to reproduce significantly the same track after the second reproduction or later. The typical example of the process for restoring the reproducing layer after the transfer reproduction to the state before the transfer will now be described. Incidentally, there are several modifications concerning the restoring process as described hereinafter.

(2-2. Typical Example of Restoring Process After the Transfer Operation):

In this case, the restoring process conforming with the typical example of the transfer reproduction processes described above is mainly described. The other restoring processes will be described hereinafter under item (4) of "Modifications of the transfer reproduction process and the magnified transfer reproduction process".

In the typical transfer reproduction process described above, the initial state of the phase-change reproducing layer (i.e., the state before the transfer) is crystalline, and the absorbance of the reproducing layer is increased in the mark portion of the recording layer. Also, that portion of the reproducing layer heated to a temperature not lower than the melting point Tmr is melted so as to cause the mark of the recording layer to be transferred to the molten portion, with the result that the optical response in the molten portion of the reproducing layer is rendered markedly different from that in the portion that is not melted so as to make it possible to achieve reproduction.

In the case of the typical example of the transfer reproduction described above, the restoration after the melting and transfer implies the recrystallization after passage of the reproducing beam. The recrystallization after the melting is known in the art in the ordinary phase-change recording technology. In the present invention, the recrystallization after the melting is positively utilized.

FIG. 6 is a graph exemplifying the change with time (t) in the temperature (Tr) of the reproducing layer (temperature hysteresis) in the transfer process. In the graph of FIG. 6, Tmr denotes the melting point of the reproducing layer, Txr denotes the crystallizing temperature of the reproducing layer, and txr denotes the time required for the reproducing layer to pass through the temperature zone in which the crystallization can be achieved in the cooling process after the transfer.

FIG. 7 is a graph showing the relationship between the temperature Tr of the reproducing layer and the frequency function (vr) of the crystallization in the reproducing layer. In the graph of FIG. 7, Gr denotes the frequency function of the crystal growth, and Nr denotes the frequency function of the crystal nucleus formation. It is widely known to the art in the field of the phase-change material that the crystallizing time ($\tau$) of the material of the phase-change film is changed depending on the constituent elements, the composition thereof and the thickness of the phase-change film. In the phase-change reproducing layer according to the present invention, the crystallizing time ($\tau xr$) is set shorter than the time txr shown in FIG. 6. The time txr is dependent on the moving speed (linear velocity: Vl) of the medium relative to the reproducing light, on the strategy in the reproducing stage (the ordinary reproduction being performed in a DC manner), and on the thermal response of the medium. If the thermal design and the selection of the material of the phase-change reproducing layer are carried out in view of the linear velocity Vl, the reproduction strategy, and the thermal response the medium, it is possible to satisfy the condition of $\tau xr < txr$. The examples of the specific materials will be described hereinafter. Also, the crystallization after the melting of the reproducing layer takes place in the temperature zone lower than the melting point Tmr and not lower than the temperature Txr. In the temperature zone close to the melting point Tmr, the crystal growth is predominant as shown in FIG. 7, and in the temperature zone close to the crystallizing temperature Txr, the crystal nucleus formation is predominant. It is also possible to set Gr and Nr at appropriate values by selecting the constituting elements and the composition of the phase-change reproducing layer.

Also, in the case of selecting the phase-change reproducing layer in which the crystallizing temperature Txr is not higher than the temperature of the environment in which the medium is used, it is clearly possible to restore the reproducing layer to the initial state until the next reproducing operation even if txr is shorter than $\tau xr$.

In such a manner, the molten transfer portion of the phase-change reproducing layer is recrystallized and restored to the state before the transfer after passage of the reproducing laser beam. It follows that it is possible to realize the transfer reproduction process as already described in conjunction with FIGS. 2 to 5.

(3) Typical Example of the Magnified Transfer Reproduction Process:

Typical example of the magnified transfer reproduction process according to an embodiment of the present invention will now be described with reference to the accompanying drawings. FIGS. 8 and 9 are intended to explain the typical principle of the magnified transfer reproduction process of the present invention. The members performing the functions equal to those performed by the members shown in the drawings referred previously are denoted by the same reference numerals.

FIGS. 8 and 9 show the changes with time in the state, covering the case where the recording medium is moved from the right to the left relative to the reproducing beam, like FIGS. 2 to 5. To be more specific, FIG. 8 corresponds to the state at time t1, and FIG. 9 corresponds to the state at time t3. Incidentally, time t1 and time t3 are as defined previously.

Figure 8A:
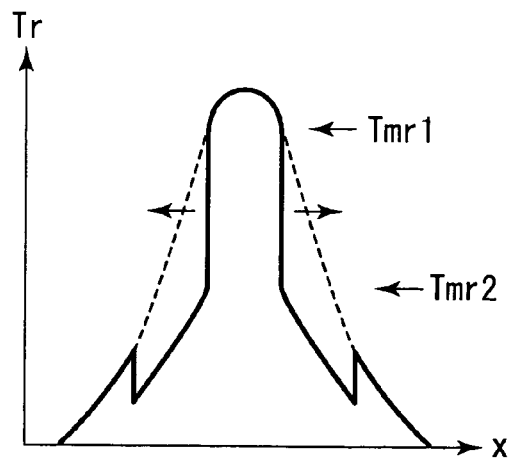
FIGS. 8A to 8C show the principle of magnified transfer reproduction according to an embodiment of the present invention.
Figure 9A:
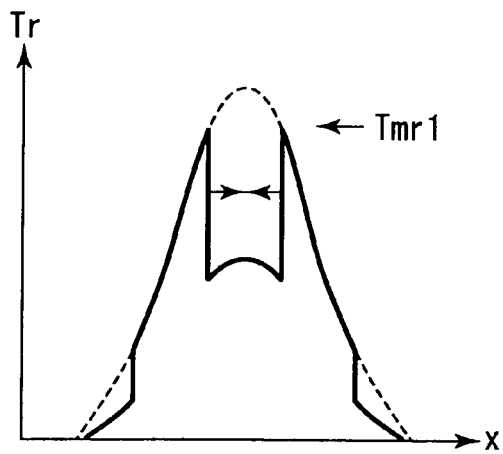
FIGS. 9A to 9C show the principle of magnified transfer reproduction according to an embodiment of the present invention.
Figure 8B:
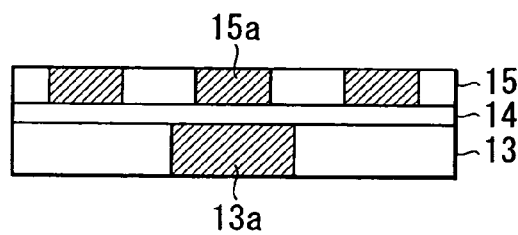
Figure 9B:
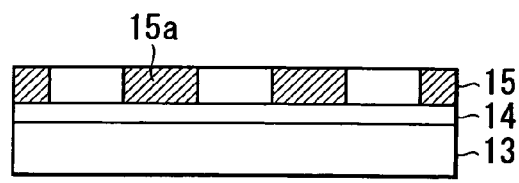
Figure 8C:
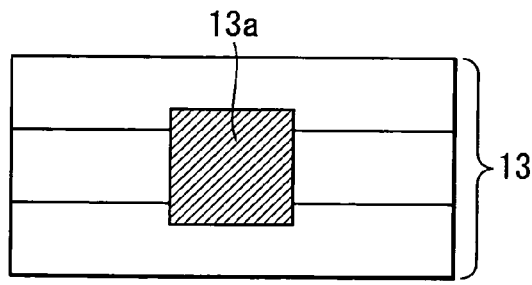
Figure 9C:
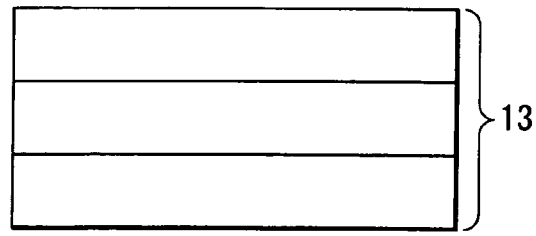

Also, FIGS. 8A to 8C and 9A to 9C correspond to FIGS. 2C to 2E, 3C to 5E, 2D to 5D and 2E to 5E. Since the states corresponding to FIGS. 2A, 2B, 3A, 3B, 4A, 4B, 5A and 5B are exactly the same in FIGS. 8 and 9, the states corresponding to these drawings are omitted in FIGS. 8 and 9. To be more specific, FIGS. 8A and 9A are graphs each showing temperature distribution of the phase-change reproducing layer in the magnified transfer reproduction process. FIGS. 8B and 9B are cross-sectional views showing the recording medium after the transfer operation. Further, FIGS. 8C and 9C are plan views of the recording medium after the transfer as viewed from the side of the reproducing layer 13.

The basic idea of the magnified transfer reproduction is to utilize the sharp temperature distribution in the in-plane direction of the phase-change reproducing layer formed in the transfer stage. The principle of magnified transfer reproduction according to the present invention will now be described with reference to FIGS. 8 and 9. In FIG. 8A, the temperature of the region in the vicinity of the center of the phase-change reproducing layer corresponding to the mark in the recording layer is selectively elevated, and the temperature of the phase-change reproducing layer is lowered in the portion corresponding to the space in the recording layer. In other words, a sharp thermal diffusion is generated in the in-plane direction of the phase-change reproducing layer, as denoted by arrows in FIG. 8A. In accordance with the thermal diffusion, the mark transferred to the phase-change reproducing layer is expanded in the in-plane direction of the film, with the result that the mark is magnified to a size larger than the size of the mark in the recording layer as shown in FIGS. 8B and 8C.

In the present invention, the process of magnified transfer reproduction is not absolutely necessary. However, the particular process provides a preferred embodiment of the present invention. In order to facilitate the process of magnified transfer reproduction, it is possible to take various measures. For example, it is desirable to use materials having a high thermal conductivity for forming the reproducing layer, to increase the thickness of the reproducing layer as much as possible within the range capable of establishing the present invention, and to use materials having a low thermal conductivity for forming the first interference layer and the separating layer on the upper and lower surfaces of the reproducing layer in order to promote the thermal diffusion in the in-plane direction while preventing the heat conduction in the thickness direction of the film.

In order to produce prominently the effect of the high-density recording-reproduction in the present invention, it is desirable for the mark and the space formed in the recording layer to be as small as possible, compared with the reproducing spot size. It should be noted, however, that, where the transfer reproduction are carried out in accordance with the principle shown in FIGS. 2 to 5, the ratio of the area occupied by the mark in the reproducing spot is rendered small, which is disadvantageous in terms of the amplitude of the reproduction signal. Incidentally, it is of course possible to obtain the effect of eliminating the inter-symbol interference and the cross talk so as to make it possible to achieve a significant reproduction. On the other hand, it is more desirable to magnify the transfer mark by utilizing the sharp temperature distribution in the in-plane direction of the phase-change reproducing layer because the amplitude of the reproduction signal can be improved in this case.

FIG. 9A shows the temperature distribution in the reproducing layer, covering the case where the reproducing spot substantially coincides with the center of the space in the recording layer. In this case, the thermal diffusion in the reproducing layer is exerted in the direction denoted by arrows in the drawing so as to seemingly shorten the space transferred to the reproducing layer. Where the thermal diffusion has taken place, however, the highest temperature itself is rendered lower than the temperature Tmr1, with the result that the mark adjacent to the space in the recording layer is not transferred at all to the reproducing layer. Since the initial state (the state before the transfer) of the phase-change reproducing layer is crystalline in this example, too, the reproducing layer exhibits the states shown in FIGS. 9B and 9C at time t3, and the signal level is equal to that in the case of FIG. 4.

In order to perform effectively the magnified transfer reproduction, it is useful to set the modulation scheme and the write strategy such that the shortest mark length is rendered longer than the shortest space length or the shortest mark length is rendered shorter than the shortest space length. In the typical example of the magnified transfer reproduction, it is desirable for the shortest mark length to be set shorter than the shortest space length.

Figure 10A:
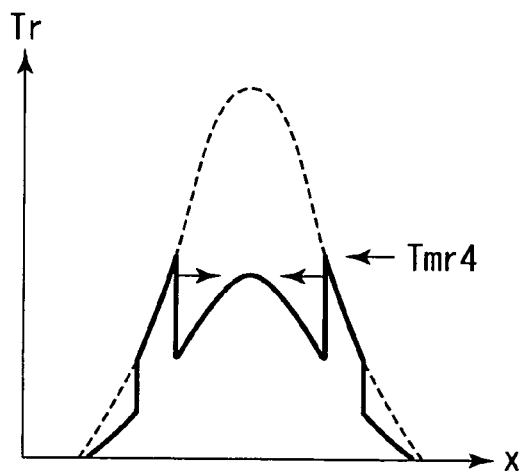
FIGS. 10A to 10C show the principle of magnified transfer reproduction according to an embodiment of the present invention.
Figure 10B:
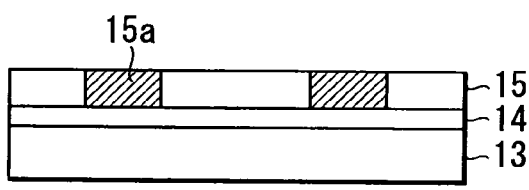
Figure 10C:
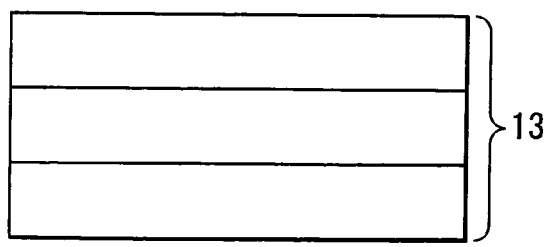

FIGS. 10A to 10C exemplify the processes of the magnified transfer reproduction in which the shortest mark length is set shorter than the shortest space length. FIGS. 10A to 10C show the state at time t3 like FIGS. 9A to 9C. The shortest mark length can be set shorter than the shortest space length by the modulation scheme and the write strategy in the recording stage, which is one of the features of the optical recording-reproducing apparatus of the present invention. In this case, the adjacent mark is not transferred at all in transfer reproducing the space even if the melting point Tmr is set at the temperature Tmr4 that is lower than the temperature Tmr1 shown in each of FIGS. 8A and 9A, because the space length is large.

Also, if the temperature Tmr4 is not lower than the temperature Tmr2 shown in FIG. 8A, which is not particularly shown in the drawing, the process of the magnified transfer reproduction apparently take place at time t1 exactly as in FIG. 8. Also, the lower limit of the temperature Tmr4 is not equal to the temperature Tmr2. It is possible for the lower limit of the temperature Tmr4 to be lower than the temperature Tmr2 as far as the space length is set longer in FIG. 10.

Figure 11A:
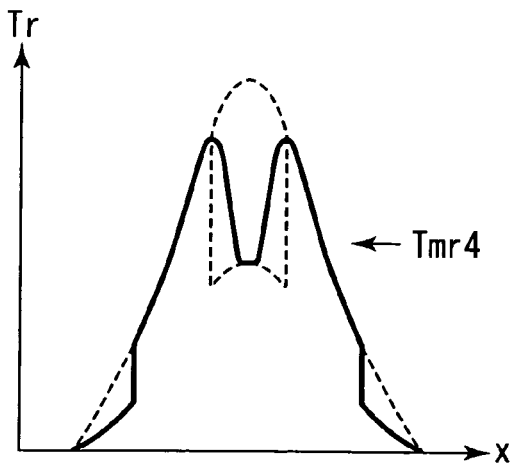
FIGS. 11A to 11C show the principle of magnified transfer reproduction according to an embodiment of the present invention.
Figure 11B:
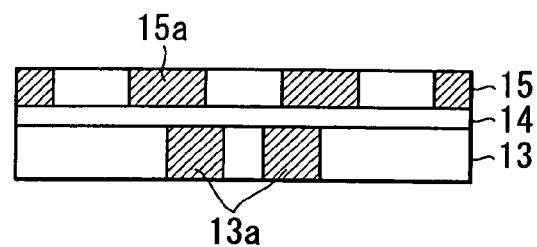
Figure 11C:
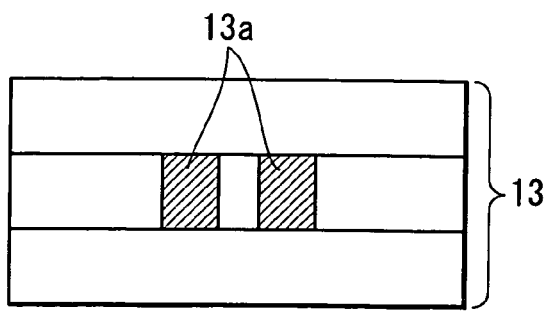

FIGS. 11A to 11 show the process of magnified transfer reproduction for the comparative case (not the prior art). FIGS. 11A to 11C show the states at time t3 like FIGS. 9A to 9C. FIGS. 11A to 11C cover the case where the mark length is substantially equal to the space length in the recording layer and the melting point Tmr is equal to the temperature Tmr 4. The broken line shown in FIG. 11A denotes the temperature distribution before the thermal diffusion takes place in the in-plane direction of the reproducing layer, and the solid line denotes the temperature distribution after occurrence of the thermal diffusion. In this case, the edge portion of the adjacent mark in the recording layer is transferred to the reproducing layer even before the occurrence of thermal diffusion in the in-plane direction of the reproducing layer. However, the transfer portion is magnified after the thermal diffusion and the reproducing level of the space is shifted to the reproducing level of the mark so as to lower the amplitude of the reproduction signal. It should be noted, however, that, if the shift amount of the space reproducing level falls within an allowable level in terms of the system, it is possible for the effect of the present invention to be exhibited even in the embodiment shown in FIG. 1.

(4) Modifications of the Transfer Reproduction Process and the Magnified Transfer Reproduction Process:

Various modifications of the transfer reproduction process and the magnified transfer reproduction process described above will now be described. Table 1 shows the conditions of the typical example and modifications of the transfer (or magnified transfer) reproduction process. To be more specific, the conditions for the transfer (or magnified transfer) reproduction are shown in Table 1 by defining the transfer in accordance with the initial state (the state before the transfer) of the phase-change reproducing layer and the state of the recording layer.

TABLE 1

Typical Example (No. 1) and Modifications (Nos. 2 to 6) of Transfer (or Magnified Transfer) Reproduction Process

| No. | Initial state of reproducing layer | State of recording layer | | Transfer | Examples of conditions of transfer (or magnified transfer) reproduction | | | |
|---|---|---|---|---|---|---|---|---|
| | | Mark (M) | Space (S) | | Masking | Transfer | Reproduction | Restoration |
| 1 | Crystalline (c) | c→m (a) | c→c | Normal | Rcr (M)~ Rcr (S) or Φ cr (M)~ Φ cr (S) | Acr (M)~ Amr (M) > Acr (S) | Rmr (M) ≠ Rcr (S) or Φ mr (M) ≠ Φ cr (S) | τxr < txr or Txr < Ta |
| 2 | Crystalline (c) | c→c | c→m (a) | Reverse | Rcr (M)~ Rcr (S) | Acr (S)~ Amr (S) > Acr | Rmr (S) ≠ Rcr (M) or | τxr < txr or |

TABLE 1-continued

Typical Example (No. 1) and Modifications (Nos. 2 to 6) of Transfer (or Magnified Transfer) Reproduction Process

| No. | Initial state of reproducing layer | State of recording layer | | Transfer | Examples of conditions of transfer (or magnified transfer) reproduction | | | |
|---|---|---|---|---|---|---|---|---|
| | | Mark (M) | Space (S) | | Masking | Transfer | Reproduction | Restoration |
| | | | | | or Φ cr (M)~ Φ cr (S) | (M) | Φ mr (S) ≠ Φ cr (M) | Txr < Ta |
| 3 | Crystalline (c) | c→ coarse c | c→c | Normal | Rcr (M)~ Rcr (S) or Φ cr (M)~ Φ cr (S) | Acr (M)~ Ac'r (M) > Acr (S) | Rc'r (M) ≠ Rcr (S) or Φ c'r (M) ≠ Φ cr (S) | τxr < txr or Txr < Ta |
| 4 | Crystalline (c) | c→m (a) | c→ coarse c | Reverse | Rcr (M)~ Rcr (S) or Φ cr (M)~ Φ cr (S) | Acr (S)~ Ac'r (S) > Acr (M) | Rc'r (S) ≠ Rcr (M) or Φ c'r (S) ≠ Φ cr (M) | τxr < txr or Txr < Ta |
| 5 | Amorphous (a) | a→c | a→a | Reverse | Rar (M)~ Rar (S) or Φ ar (M)~ Φ ar (S) | Aar (M)~ Acr (M) > Aar (S) | Rcr (M) ≠ Rar (S) or Φ cr (M) ≠ Φ ar (S) | Irradiation with restoring light |
| 6 | Amorphous (a) | a→a | a→c | Normal | Rar (M)~ Rar (S) or Φ ar (M)~ Φ ar (S) | Aar (S)~ Acr (S) > Aar (M) | Rcr (S) ≠ Rar (M) or Φ cr (S) ≠ Φ ar (M) | Irradiation with restoring light |

The various conditions for the transfer reproduction shown in Table 1 will now be described. The conditions for preventing the mark and the space in the recording layer from being optically modulated (no substantial optical change as viewed from the reproducing optical system) under the state before the transfer are shown in the column of "masking". The conditions for allowing the mark or the space in the recording layer to be selectively transferred to the phase-change reproducing layer are shown in the column of "transfer". The conditions for allowing the transfer portion and the non-transfer portion to be optically modulated (there is a significant optical change as viewed from the reproducing optical system) after the selective transfer of the mark or the space in the recording layer to the phase-change reproducing layer are shown in the column of "reproduction". Further, the conditions for restoring the transfer portion of the phase-change reproducing layer to the initial state after passage of the reproducing beam are shown in the column of "restoration".

Before explaining the conditions, the definition of the symbols included in the conditional formulas given in Table 1 will now be described. Specifically, "R" in Table 1 denotes the reflectance of the reproducing layer as viewed from the reproducing optical system, "φ" denotes the phase of the reproducing layer as viewed from the reproducing optical system, and "A" denotes the absorbance of the reproducing layer. The subscripts of the symbols denote the states of the reproducing layer. Specifically, the subscript "c" denotes the crystalline state, the subscript "m" denotes the molten state, the subscript "c'" denotes the coarse crystalline state, and the subscript "a" denotes the amorphous state. Further, the subscript "r" accompanying all the symbols denotes the reproducing layer. In Table 1, it is unnecessary to use the subscript "r". However, the subscript "r" is useful for the clear distinction from the subscript "w" accompanying the recording layer, which will be referred to hereinafter. The symbol put in the parenthesis denotes the state of the recording layer. Specifically, "M" denotes the mark, and "S" denotes the space. Further, "τxr" denotes the crystallizing time of the reproducing layer, "txr" denotes the time required for the passage through the temperature zone capable of crystallization during the cooling process of the reproducing layer after the transfer, "Txr" denotes the crystallizing temperature of the reproducing layer, and "Ta" denotes the temperature of the environment in which the medium is used. For example, "Rcr(M)" denotes the reflectance when the reproducing layer r corresponding to the mark M of the recording layer is under a crystalline state c.

No. 1 given in Table 1 denotes a typical example of the transfer reproduction process. Since the details of the transfer reproduction process are already described under item (2), the various conditions for the transfer reproduction (examples of main conditions) will be mainly described in the following. Although the transfer reproduction processes are mainly described in the following, the magnified transfer reproduction processes can be performed by utilizing the sharp temperature distribution in the vicinity of the transfer portion in the reproducing layer. Such being the situation, it is obvious that the magnified transfer reproduction processes can be performed in any of the modifications as in the typical example described previously in detail in item (3).

As already described in detail in item (2), a series of processes including the melting of the phase-change reproducing layer corresponding to the mark of the recording layer, the generation of the optical change from the non-transfer portion by the melting, and the recrystallization of the transfer portion after passage of the reproducing beam constitute the principle of the transfer reproduction in the typical example (No. 1). First of all, it is necessary for the mark and the space in the recording layer not to be optically modulated (no substantial optical change as viewed from the reproducing optical system) before the transfer reproduction. To be more specific, it is necessary for a plurality of marks and spaces included in the reproducing spot to be optically equal to each other as viewed from the side of the reproducing beam in, for example, FIG. 2A. In a sense of masking the mark or the space, this is termed the masking condition.

The masking condition in the reproduction based on the reflectance difference is that, in the reproducing layer before the transfer, the reflectance (Rcr(M)) in a portion corresponding to the mark should be substantially equal to the reflectance (Rcr(S)) in a portion corresponding to the space. Also, the masking condition in the reproduction based on the phase difference is that, in the reproducing layer before the transfer, the phase ($\phi$cr(M)) in a portion corresponding to the mark should be substantially equal to the phase ($\phi$cr(S)) in a portion corresponding to the space. It is unnecessary for the reflectance Rcr(M) to coincide perfectly with the reflectance Rcr(S). It is possible for the reflectance Rcr(M) to differ from the reflectance Rcr(S) by several % to about 10%. Likewise, it is possible for the phase $\phi$cr(M) to differ from the phase $\phi$cr(S) by about scores of degrees. With increase in reflectance difference or the phase difference after the transfer, which is to be described hereinafter, the allowable amount of the reflectance difference or the phase difference before the transfer is increased.

The transfer condition is that each of the absorbance Acr(M) in a portion corresponding to the mark in the reproducing layer before the transfer and the absorbance Amr(M) in a portion corresponding to the mark in the reproducing layer after the transfer is higher than the absorbance Acr(S) in a portion corresponding to the space in the reproducing layer before and after the transfer. It should be noted that, concerning the condition required for the transfer, it is necessary for the absorbance Acr(M) to be higher than the absorbance Acr(S), and it is not absolutely necessary for the absorbance Amr(M) to be high. However, if the absorbance of the transfer portion is rendered excessively low after the melting and the transfer, it is possible for the molten section to be partly crystallized during the transfer and the reproduction. Thus, it is desirable for the absorbance Amr (M) to be set higher than the absorbance Acr(S). It is described that the absorbance in a portion corresponding to the space in the reproducing layer before the transfer would coincide with that after the transfer. This is because there is no optical change in the space between the state before the transfer and the state after the transfer, as apparent from the principle described previously in item (2). It should be noted, however, that the present invention can be achieved even if an optical change (such as the absorbance or the reflectance) in the space has been generated in the space of the reproducing layer between the state before the transfer and the state after the transfer by the other factor such as the temperature elevation caused by irradiation with the reproducing beam.

The reproduction condition for reproduction based on the reflectance difference is that, in the reproducing layer after the transfer, the reflectance Rmr(M) in a portion corresponding to the mark should be different from the reflectance Rcr(S) in a portion corresponding to the space. Also, the reproduction condition for reproduction based on the phase difference is that, in the reproducing layer after the transfer, the phase $\phi$mr(M) in a portion corresponding to the mark should be different from the phase $\phi$cr(S) in a portion corresponding to the space. It is desirable for the difference between the reflectance Rmr(M) and the reflectance Rcr(S) and the difference between the phase $\phi$mr(M) and the phase $\phi$cr(S) to be as large as possible because the amplitude of the reproduction signal is increased with an increase in the difference noted above.

The restoring condition is as already described in item (2-2).

Next, transfer (or magnified transfer) reproduction processed and conditions thereof for modifications will be described. As shown in Table 1, three modifications (Nos. 2 to 4) of transfer (or magnified transfer) reproduction are included in the case where the initial state of the phase-change reproducing layer is crystalline, and two modifications (Nos. 5 and 6) are included in the case where the initial state of the phase-change reproducing layer is amorphous.

No. 2 is directed to a modification in which the absorbance of the phase-change reproducing layer is controlled to be low in the mark of the recording layer and to be high in the space, which is opposite to that in the case of No. 1. In this case, the temperature of the phase-change reproducing layer is elevated in the portion corresponding to the space of the recording layer, and the temperature elevation is suppressed in the portion corresponding to the mark. The details of the transfer (or magnified transfer) reproduction process are similar to those described previously in items (2) and (3), except that the mode of the transfer is rendered opposite to that in the typical example of No. 1 (reverse transfer). Also, concerning the conditions for the transfer and the reproduction, it suffices to reverse the mark and the space in the case of the typical example of No. 1 and, thus, the detailed description is omitted.

No. 3 is directed to the case where the absorbance of the phase-change reproducing layer is controlled to be low in a portion corresponding to the mark of the recording layer and to be high in a portion corresponding to the space, and the temperature of the transfer portion is not elevated to reach the melting point Tmr of the phase-change reproducing layer but is elevated to the level not lower than the crystallizing temperature Txr. In this case, it is desirable for the initial state of the phase-change reproducing layer to be rendered microcrystalline. However, it is possible to control the diameter of the crystal grain in the initial state by the selection of the phase-change reproducing layer and the initializing conditions. It is known to the art that the optical constant of the material of the phase-change film is changed depending on the diameter of the crystal grain. This is utilized in each of the modified examples Nos. 3 and 4. As already shown in FIG. 7, a region (Gr) in which the crystal growth is predominant, which is present in a portion close to the melting point Tmr, is included in the temperature zone in which the phase-change reproducing layer can be crystallized. Therefore, even if the temperature of the reproducing layer in the transfer stage is lower than the melting point Tmr, the diameter of the crystal grain in the transfer portion can be increased when the temperature of the reproducing layer is elevated to the region of high Gr shown in FIG. 7. As a result, an optical change is generated so as to make it possible to perform the reproduction operation. In this case, it is possible to obtain the essential effect of the present invention, though the amplitude of the reproduction signal is rendered low, compared with the typical example of No. 1 and the modified example of No. 2, because the change in the optical constant between the fine crystal and the coarse crystal is utilized. Also, in each of the typical example of No. 1 and the modified example of No. 2, the recrystallization after the melting is utilized for the restoration of the reproducing layer to the initial state after the transfer. On the other hand, in each of the modified examples of Nos. 3 and 4, the crystal portion coarsened in the transfer stage is passed through the temperature zone having a high nucleus forming frequency (Nr) as shown in FIG. 7 in the cooling process after passage of the reproducing beam, with the result that the crystal portion can be restored again to the initial microcrystalline state. It may be reasonable to state that reverse transfer is achieved in the modified example of No. 3 in the sense that the phase-change reproducing layer corresponding to the mark of the recording layer is rendered coarse crystalline state. However, the transfer for the modified example of No. 3 is defined to be the normal transfer because the transfer is equal to that in the typical example of No. 1 in the sense that the temperature of the phase-change reproducing layer corresponding to the mark of the recording layer is selectively elevated so as to change the optical constant. The transfer condition for the modified example of No. 3 is as shown in Table 1 and, thus, the detailed description thereof is omitted.

The modified example of No. 4 is already described partly in conjunction with the modified example of No. 3. The relationship between the modified examples of Nos. 3 and 4 is similar to that between the typical example of No. 1 and the modified example of No. 2. To be more specific, in the modified example of No. 3, the temperature of the phase-change reproducing layer corresponding to the mark of the recording layer is selectively elevated so as to form the coarse crystal. On the other hand, in the modified example of No. 4, the temperature of the phase-change reproducing layer corresponding to the space of the recording layer is selectively elevated so as to form the coarse crystal (reverse transfer). The process thereafter is equal to that for the modified example of No. 3. Also, concerning the transfer reproduction conditions, it suffices to reverse the mark and the space for the modified example of No. 3.

Each of the modified examples of Nos. 5 and 6 is directed to the case where the initial state of the phase-change reproducing layer is amorphous. To make the initial state of the phase-change reproducing layer amorphous, it suffices to use the amorphous state as deposited or to initialize the molten state at such a linear velocity as not to cause recrystallization. The details of these modified examples are equal to those for the typical example of No. 1. It is possible to design the change in the absorbance of the reproducing layer in accordance with the recording mark and the space when the phase-change reproducing layer is in the amorphous state by controlling the construction, the material, the deposition conditions and the thickness of each of the first interference layer, the second interference layer, the separating layer, and the reflecting layer shown in FIG. 1. In the modified example of No. 5, the absorbance of the phase-change reproducing layer corresponding to the recording mark is selectively set at a high value, and the reproducing layer is heated to the temperature falling within the range between the crystallizing temperature and the melting point so as to crystallize the transfer portion. The modified example of No. 5 is equal to the typical example of No. 1 in the sense that the temperature of the phase-change reproducing layer corresponding to the mark of the recording layer is selectively elevated so as to change the optical constant. However, since the mark of the recording layer is transferred to the reproducing layer in the form of a crystal, the transfer for the modified example of No. 5 is defined as reverse transfer. In the modified example of No. 6, the temperature of the phase-change reproducing layer corresponding to the space of the recording layer, which is opposite to that for the modified example of No. 5, is selectively elevated to the level not lower than the crystallizing temperature for achieving the transfer and the reproduction in the form of a crystal. The transfer for the modified example of No. 6 is defined as normal transfer. The modified examples of Nos. 5 and 6 differ from the modified examples of Nos. 3 and 4 in that it is not absolutely necessary to elevate the temperature in the reproducing layer of the transfer portion to the temperature zone having a high value of Gr in FIG. 7, and it suffices to elevate the temperature noted above to about the temperature zone having a high value of Nr.

The transfer and the reproduction conditions for the modified examples of Nos. 5 and 6 are as shown in Table 1 and, thus, the detailed description of these conditions is omitted. It should be noted, however, that modified examples of Nos. 5 and 6 differ from the examples of No. 1-4 in the restoration condition. Where the transfer portion of crystal is formed in the reproducing layer whose initial state is amorphous, it is impossible to restore again the transfer portion to the initial amorphous state in the cooling process at the time when the reproducing beam is moved away. It follows that a positive means for restoring the reproducing layer to the state before the transfer after the process of the transfer (or magnified transfer) reproduction is required in each of the modified examples of Nos. 5 and 6. The particular means includes, for example, the means for bringing the track in reproduction to the initial amorphous state at a linear velocity high enough not to bring about the recrystallization. It is possible for this means to be a light beam equal to at least one of the light beams used for the recording and for the reproduction. It is also possible to use another light beam irradiating means as the particular means. Also, as described in conjunction with the recording principle described hereinafter, the present invention includes the embodiment that the temperature of the phase-change reproducing layer is elevated during the recording operation to form a molten state either in the formation of mark or in the formation of space. Therefore, it is possible to initialize the reproducing layer by utilizing the particular recording operation. Where the reproducing operation of the same track is consecutively carried out a plurality of times, the initializing operation, differing from the reproducing operation and the recording operation, is required after the reproduction carried out once. In this case, it is possible to perform the operation requiring two rotations by using a recording or reproducing beam. It is also possible to perform the initializing operation by means of irradiation with another light beam.

The means for initializing the reproducing layer is absolutely required in each of the modified examples of Nos. 5 and 6. However, the means for initializing the reproducing layer is not absolutely required in the transfer (or magnified transfer) reproduction processes shown in Table 1 other than those. However, it is possible to employ a positive means such as irradiation with an initializing beam as in the modified examples of Nos. 5 and 6 in the case where the melting and recrystallization in the cooling process after the transfer is insufficient as in the typical example of No. 1 and the modified example of No. 2 and in the case where the microcrystallization in the cooling process after the transfer is insufficient as in each of the modified examples of Nos. 3 and 4.

(5) Principle of the Recording

Typical examples will now be described in respect of the recording principle suitable for the present invention. The basic concept of the present invention is to cope with the high-density recording by the transfer reproduction. In order to realize a sufficiently high recording density, it is desirable to form in the recording stage the recording mark and the space at the size not larger than the reproducing resolution.

The simplest means for forming the recording mark and the space at the size not larger than the reproducing resolution is to make the size of the recording beam smaller than the size of the reproducing beam, i.e., to change at least one of λ and NA. However, this measure is not desirable in that the optical system is rendered complex.

Where the recording and reproduction are carried out by using the same optical system, the simplest method for forming the recording mark and the space in the size not larger than the reproducing resolution is the method (i.e., the so-called "pen-tip recording") using the rise portion of the Γ-characteristics (the rise characteristics of the signal amplitude relative to the recording power). However, this method is not practical because the fluctuation of the recording mark and the space is rendered very large relative to the temperature of the environment in which the medium is used. It is conceivable to control strictly the recording power by monitoring the temperature of the environment in which the medium is used. However, it is difficult to achieve a perfect control because the temperature of the environment in which the medium is used is not necessarily coincident with the temperature of the nonirradiated portion of the recording layer.

Under the circumstances, the means for stably forming the recording mark and the space in the size not larger than the reproducing resolution will now be described, covering the case where the recording and the reproduction are carried out by using the same optical system. The recording layer is not particularly limited in the present invention. It is possible for the recording layer to be freely selected from the group consisting of a phase-change recording layer, a write-once recording layer and a read-only recording layer. The following describes the means for forming the recording mark and the space in the size not larger than the reproducing resolution by using the same optical system both in recording and reproducing operations for each kind of the recording layer.

(5-1. Phase-change Recording Layer):

The recrystallization in the cooling process after the recording in the phase-change recording is known to the art as described previously in item 2-2 directed to the restoration of the phase-change reproducing layer to the initial state after the transfer. Where a phase-change recording layer is used, the recrystallization phenomenon after the melting is used. FIG. 12 is a graph showing the changes with time (t) in the temperature (Tw) of the recording layer (temperature hysteresis) in the stage of forming the recording mark (amorphous mark) in the recording process. Tmw shown in the graph denotes the melting point of the recording layer, Txw denotes the crystallizing temperature of the recording layer, and txw denotes the time required for the passage of the recording layer through the temperature region in which the recrystallization can be achieved in the cooling process after the melting. FIG. 13 is a graph showing the relationship between the frequency function (vw) for the crystallization of the recording layer and the temperature (Tw) of the recording layer. Gw shown in the graph denotes the frequency function for the crystal growth of the recording layer, and Nw denotes the frequency function for the crystal nucleus formation in the recording layer.

The frequency functions Gw and Nw can be controlled by means of the constituent elements and composition of the recording layer and the deposition method of the recording layer. The time txw is dependent on the linear velocity in the recording stage, the recording power (Pw), the write strategy in the recording, and the thermal response of the medium. The crystallizing time (τw) of the recording layer is determined by the frequency functions Gw and Nw. However, it is possible to form in the recording layer the mark and the space of the size smaller than the resolution of the recording beam by designing appropriately the relationship between the crystallizing time τw and the time txw.

FIGS. 14 and 15 exemplify the formation in the recording layer of the mark and the space having the size smaller than the resolution of the recording beam. In FIGS. 14 and 15, the members performing the functions equal to those performed by the members shown in the drawings referred to previously are denoted by the same reference numerals.

Figure 14A:
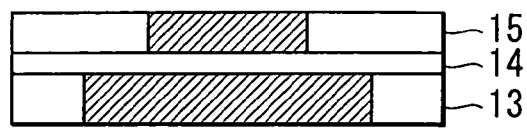
FIGS. 14A and 14B show the recording principle according to an embodiment of the present invention.
Figure 14B:
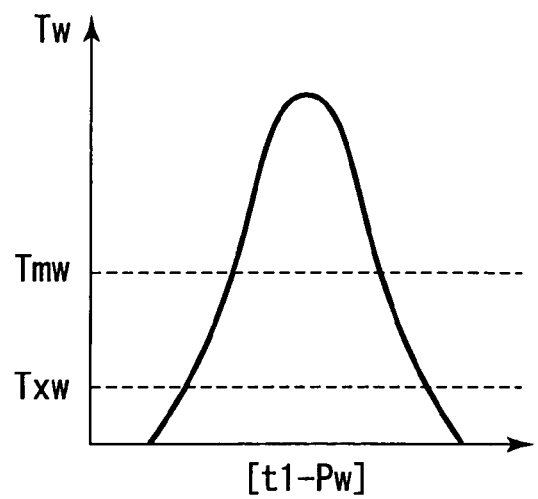
Figure 15A:
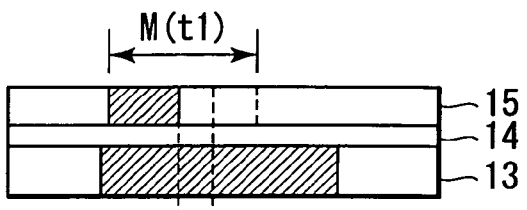
FIGS. 15A and 15B show the recording principle according to an embodiment of the present invention.
Figure 15B:
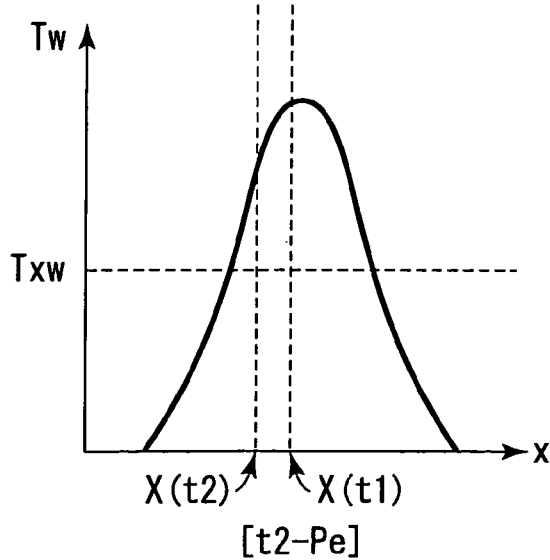

FIG. 14 shows the state that the recording layer is irradiated with a recording beam at a power level to form a recording mark (Pw) at time t1. FIG. 15 shows the state that the recording layer is irradiated with a recording beam at a power level to form a crystal space (Pe) at time t2 after time t1. Each of FIGS. 14A and 15A is a cross-sectional view showing the recording medium in the recording process. The hatched portion denotes the molten portion or the amorphous portion. Also, each of FIGS. 14B and 15B is a graph showing the temperature distribution in the recording layer.

In the case of selecting the power Pw, which is stable and has a wide margin in the Γ characteristics, in place of the pen-tip recording, that portion of the recording layer which corresponds substantially to the full width at half maximum (FWHM) in the recording beam is melted. The FWMH diameter can be substantially given by λ/(2NA), where λ represents the recording wavelength, and NA denotes the numerical aperture of the objective lens. FWHM is about 330 nm in the case where λ is 413 nm and NA is 0.65 as referred to hereinafter. The size of that portion of the optical recording layer 15 hatched in FIG. 14A corresponds to FWHM. As shown in FIG. 14B, the molten portion of the reproducing layer 13 is broader than the molten portion of the recording layer 15. However, the molten portion of the reproducing layer 13 is restored to the initial state after passage of the recording beam, as described previously.

In the recording layer 15, a region of about FWHM is once melted. However, it is possible for the molten region to be partly recrystallized when the recording power is changed from Pw to Pe. FIG. 15 shows the particular situation. The molten portion at time t1 is denoted by M(t1), and the position of the recording layer 15 melted at time t1 and recrystallized at time t2 is denoted by X. To be more specific, the molten portion positioned at X(t1) at time t1 is moved to the position of X(t2) at time t2 by the movement of the medium. Where t2-t1, Pw, Pe and the write strategy are set appropriately, the point X is recrystallized during the time zone of t2-t1. As a result, only that portion of the optical recording layer 15 hatched in FIG. 15A is formed as an amorphous mark. Concerning the recrystallization of the point X during the time zone of t2-t1, it is possible for Gw shown in FIG. 13 to be predominant or for Nw to be predominant. However, according to a conventional report, it is more desirable for Gw to be predominant in order to make prominent the melting and recrystallization. The description given above covers the preferred recording process in the case of employing a phase-change recording layer.

(5-2. Write-once Recording Layer):

The write-once recording layer includes a recording layer (so-called "R") using an organic dye represented by a phthalocyanine dye or an azo dye and a recording layer (so-called "WO" or "WORM") using an inorganic recording layer represented by, for example, Ge—Te, Te—C, Te—$O_x$, or Te—Pd—O$_x$. In the case of using these materials, it is impossible to employ the means such as the melting and recrystallization of the phase-change recording layer described previously in item (5-1). In the case of using these materials, it is advisable to make the recording beam finer than the reproducing beam or to use the pen-tip recording. However, in the case of the phase-change WORM recording layer in which the crystallizing time is very long (unlikely to be crystallized) such as GeTe, it is possible to utilize the melting and recrystallization described previously in item (5-1) in the method of decreasing the moving velocity of the medium in the recording stage.

(5-3. ROM)

As known to the art, the recording of ROM is performed by mastering process. It is relatively easy to form the mark (pre-pit) and the space smaller than the reproduction limit by the wavelength of the light and NA used in the mastering. In the case of using an electron beam mastering, it is possible to record the mark and space further smaller than those formed by the light mastering. In the case of employing the phase-change recording layer, the magneto-optical recording layer or the write-once recording layer, the header section is recorded in general as ROM. It follows that the particular technology can be applied to any type of the recording medium. However, where it is difficult to optimize the processes of the magnified transfer reproduction in both the header section and the data section, it is advisable to record in the header section the mark and the space slightly larger than the reproduction limit. Also, where the header section and the data section differ from each other in the optimum reproducing power for the magnified transfer reproduction, it is advisable to change the reproducing power for the header section and for the data section. This also constitutes a feature of the optical recording-reproducing apparatus according to the present invention.

(6) The Material and Deposition Method of Each of the Layers Included in the Optical Recording Medium of the Present Invention:

The materials and deposition methods of each of the layers included in the optical recording medium of the present invention will now be exemplified. Suitable materials for each layer in accordance with the construction shown in FIG. 1 are exemplified. First of all, the phase-change reproducing layer will be described, followed by describing the recording layer, the separating layer, the first interference layer, the second interference layer, and the heat control layer in the order mentioned. However, since the three layers including the separating layer, the first interference layer and the second interference layer are common to each other in many respects, they will be described collectively.

(6-1. Phase-change Reproducing Layer):

The materials and the deposition methods for the phase-change reproducing layer will be exemplified first.

The conditions for the transfer reproduction among the various conditions required for the reproducing layer are as already shown in Table 1 and described partly in item (4) directed to the modifications of the transfer (or magnified transfer) reproduction processes. The conditions shown in Table 1, which are related to the selection of the materials of the reproducing layer, are also deeply related to the selection of the materials (particularly, the optical constant and the thermal constant), the thickness and the depositing conditions of each layer included in the recording medium. The reproducing layer is required to exhibit a reversible phase-change (including the case of the irradiation with a restoring light beam).

In the typical example of No. 1 and the modified example of No. 2, such conditions as given below are required in order to melt the transfer portion in the reproducing layer:

(i) The melting point (Tmr) of the phase-change reproducing layer should be suitably low.

(ii) Since the phase-change reproducing layer is heated to a considerably high temperature in the recording stage, the phase-change reproducing layer should exhibit a high resistance to the repeated heat hysteresis (as described hereinafter, the temperature of the reproducing layer is not elevated abnormally because of heat conduction in the in-plane direction and the thickness direction.)

(iii) The phase-change reproducing layer should exhibit a large optical change between the states before the transfer and after the transfer, i.e., between the crystalline state and the molten state (the optical change can be increased by the design of all the layers included in the recording medium).

(iv) The crystallizing time (τxr) of the phase-change reproducing layer should be short or the crystallizing temperature Txr should be low in order to meet the restoration condition (this is also the case with the modified examples of Nos. 3 and 4.)

The requirements peculiar to the modified examples of Nos. 3 and 4 are that the phase-change reproducing layer should have an appropriate value of the crystallizing temperature Txr (the crystallizing temperature should not be excessively high), and that the difference in the optical constant (complex refractive index) between the microcrystals and the coarse crystals should be large (which can be achieved by the design of all the layers included in the recording medium) because the reproducing layer of the transfer portion is coarsely crystallized. In the modified examples of Nos. 3 and 4, the temperature elevation of the reproducing layer can be suppressed in the recording stage to the level considerably lower than that for the typical example of No. 1 and the modified example of No. 2. Such being the situation, the requirement for the resistance to the repeated thermal hysteresis is not severe.

The requirement peculiar to the modified examples of Nos. 5 and 6 is that the phase-change reproducing layer should be restored to the initial amorphous state by irradiation with a restoring light beam in addition to the requirement (i) for the modified examples of Nos. 3 and 4 and the requirement (iii) for the typical example of No. 1 and the modified example of No. 2.

Table 2 exemplifies the elements suitable for use for forming the phase-change reproducing layer of the present invention and the melting point of each of these elements. In order to allow the phase-change reproducing layer to bring about a reversible phase-change, the materials equal to that known as the general phase-change recording material are used.

TABLE 2

Typical examples of the elements constituting the phase-change reproducing layer and the melting point of the elements

| Element | Melting point (° C.) |
|---------|----------------------|
| Zn      | 420                  |
| In      | 157                  |
| Sn      | 232                  |
| Se      | 220                  |
| Bi      | 271                  |
| S       | 119                  |
| Te      | 450                  |

TABLE 2-continued

Typical examples of the elements constituting
the phase-change reproducing layer and
the melting point of the elements

| Element | Melting point (° C.) |
|---|---|
| Sb | 631 |
| Ge | 959 |
| Ag | 962 |
| Pb | 328 |
| Ga | 30 |
| Rb | 39 |
| Tl | 303 |
| Cs | 29 |

Typically, it is desirable for the phase-change reproducing layer used in the present invention to have a composition on the line of the Ge—Sb—Te pseudo-binary alloy (i.e., the line joining the two intermetallic compounds of GeTe and $Sb_2Te_3$) and a composition falling within a range of about ±10 atomic % (at %), preferably about ±5 at %, and more preferably about ±2 at % in a direction perpendicular to the pseudo-binary alloy line, in particular, a composition in $Sb_2Te_3$ rich having a short crystallizing time τxr. Also, it is possible to use a composition on the line joining the elemental Sb and the elemental Te, in particular, a composition falling with the range of ±20 at % of $Sb_2Te_3$. It is also possible to use a composition falling with a range of ±20 at % of the $Sb_{70}Te_{30}$ eutectic composition. Further, it is possible to use a composition prepared by adding or substituting about 0 to 30 at %, preferably, about 2 to 20 at % of Ag, In or Ge to the compositions given above.

Incidentally, in the case of melting the phase-change reproducing layer in the transfer stage, in particular, in the case of using a recording layer formed of a material other than ROM as in the typical example of No. 1 and the modified example of No. 2, it is desirable to use an alloy prepared by adding or substituting at least one metal having a low melting point, which is shown in Table 2, e.g., at least one element selected from the group consisting of Zn, In, Sn, Se, Bi, S, Pb, Ga, Rb, Tl and Cs, to the semi-metal simple substance or the chalcogen-based alloy given above in an amount of about 2 to 50 at %, preferably about 5 to 40 at %, and more preferably about 10 to 30 at %. It is advantageous to add these metals having a low melting point because it is possible to lower the temperature of the reproducing layer in the transfer stage and to prevent the temperature of the reproducing layer from being excessively elevated in the recording stage. However, it is not desirable to use Cs in view of radioactivity, to use Tl in view of toxicity, to use Rb because Rb is rare, or to use Pb in view of the environmental pollution problem. Such being the situation, it is particularly desirable to add at least one element selected from the group consisting of In, Sn, Se, Bi, S and Ga in order to lower efficiently the melting point Tmr. It is desirable for the melting point Tmr to fall within a range of between 150° C. and 450° C., preferably between 200° C. and 400° C. It is desirable for the crystallizing time τxr to fall within a range of between 2 and 40 nsec, preferably between 2 and 20 nsec, in the case where the crystallizing temperature Txr is higher than the operating temperature of the medium. It is desirable for the thickness to fall within a range of between 5 and 80 nm, preferably between 10 and 50 nm. The optimum values of the melting point Tmr, etc., are determined in accordance with the thermal response of the recording medium (the construction of the recording medium as well as the apparatus conditions such as the linear velocity, the power and the write strategy).

In order to prevent the-reproducing layer from being deteriorated by flowing in the recording stage for improving the resistance to the thermal hysteresis, it is desirable to add at least one kind of the material having a high melting point, which is selected from the group consisting of W, Mo, Ta, B, C, Si, Ti, V, Cr, Mn, Fe, Co, Ni, Cu, Y, Zr, Nb, Tc, Ru, Pd, a lanthanide metal, Hf, Re, Os, Ir, Pt and Au, in an amount falling within a range of between 2 and 20 at %, preferably between 5 and 10 at %. It is also possible to add materials having a high melting point such as an oxide, a nitride, a carbide, a boride or a fluoride in addition to the metals having a high melting point, which are enumerated above. The oxide, nitride, carbide, sulfide, boride and fluoride referred to above are also suitable for use as the materials of the interference layer and the separating layer described hereinafter and, thus, the specific compounds will be exemplified hereinafter.

The materials described above are suitable for use for forming the phase-change reproducing layer in mainly the typical example of No. 1 and the modified example of No. 2. In the case of the modified examples of Nos. 3 and 4, is melting point Tmr is not particularly limited, and it is desirable for the crystallizing time τxr to be set somewhat shorter than for the typical example of No. 1 and the modified example of No. 2. In the case of the modified examples of Nos. 5 and 6, the melting point Tmr is not particularly limited, and the crystallizing time Txr is also not particularly limited.

The candidates of the materials used for forming the phase-change reproducing layer and satisfying the conditions that the transfer is brought about at an appropriate temperature and that the optical characteristics are changed by the transfer include, for example, $Ag-O_x$ (x: 0.5 to 1.5) proposed in the so-called "Super-RENS", leuco dye, a photochromic organic material (in this case, irradiation with a restoring beam is required) and fullerene, which are proposed as a super-resolution film material, in addition to the chalcogen-based phase-change film material described above and the phase-change film material prepared by adding a low melting point metal.

As described above, it is possible to use various materials in the present invention for the phase-change reproducing layer. For depositing the phase-change reproducing layer, it is possible to employ various methods including sputtering, evaporation, spin-coating and CVD. It is possible to control the optical constant, the thermal constant, the crystallizing temperature and the crystallizing time by the selection of the deposition method and the deposition conditions in addition to the selection of materials and the thickness of the reproducing layer. For example, in the case of depositing a chalcogen-based phase-change reproducing layer by sputtering, it is possible to control the physical constants thereof by selecting appropriately the sputtering gas species, the gas pressure, the sputtering power, the cathode drop voltage, and the positional relationship between the target and the substrate.

(6-2. Recording Layer):

As described previously in item (5) directed to the recording principle, the recording layer is not particularly limited in the present invention. It is possible to employ any of the phase-change recording layer, the write-once recording layer and ROM in the present invention.

It is possible to employ the film material similar to the material of the phase-change reproducing layer described previously for the phase-change recording layer. However, the recording layer differs from the reproducing layer in the suitable composition range of the material.

As apparent from the principle described previously in item (5), the phase-change recording layer is required, for example, to have an appropriate crystallizing time ($\tau xw$) such that fine marks and spaces smaller than the optical limit of the recording light can be recorded by the melting and the recrystallization, to have an appropriately high crystallizing temperature (Txw) such that the degradation of reproduction (local crystallization of the amorphous mark) is unlikely to be brought about in the reproducing stage, and to have an appropriately low melting point (Tmw) and crystallizing temperature Txw such that the phase-change reproducing layer exhibits an appropriate sensitivity.

The phase-change recording layer meeting these requirements is formed of the materials known generally as the materials of the phase-change recording layer. The materials of the phase-change recording layer used in the present invention include those having, for example, a composition on the line of the Ge—Sb—Te pseudo-binary alloy (i.e., the line joining the two intermetallic compounds of GeTe and $Sb_2Te_3$), and a composition within a range of about ±5 at %, preferably about ±2 at %, in a direction perpendicular to the pseudo binary alloy line. In particular, it is desirable to use the composition on the relatively GeTe rich side in which the crystallizing time $\tau xw$ falls within an appropriate time range. It is also possible to use a composition prepared by adding or substituting about 5 to 30 at %, preferably, about 10 to 20 at % of Ag, In or Ge to the composition falling with a range of ±20 at % of the $Sb_{70}Te_{30}$ eutectic composition.

The material of the recording layer differs from the material of the reproducing layer in that the crystallizing time $\tau xw$ is set somewhat longer than that for the reproducing layer and that the melting point Tmw is appropriately high. It is desirable for the crystallizing time $\tau xw$ to fall within a range of between 5 and 100 nsec, preferably between 10 and 50 nsec. It is desirable for the melting point Tmw to fall within a range of between 400° C. and 800° C., preferably between 500° C. and 700° C. These optimum values are determined in accordance with the thermal response of the medium (depending on the apparatus conditions such as the linear velocity, the power and the write strategy in addition to the construction of the medium.) It is desirable for the phase-change recording layer to have a thickness falling within a range of between about 5 nm and 70 nm, preferably between about 7 nm and 50 nm.

It is possible for the write-once recording layer to be formed of a dye recording layer represented by phthalocyanine or azo dye employed nowadays in the CD-R and DVD-R, or Te—C, Te—$O_x$, GeTe, or Te—Pd—$O_x$ employed or proposed in WORM. In the case of employing the write-once recording layer in the present invention, it is desirable to use a recording beam finer than the reproducing beam for recording the mark smaller than the optical limit of the recording beam. Alternatively, it is desirable to employ the pen-tip recording in the case of employing the same light beam for the recording and the reproduction. This is because it is difficult to utilize the melting and the recrystallization as in the phase-change material. However, in the case of recording the mark and the space having a size very close to the optical limit of the recording beam, it is unnecessary to use a light beam differing from the reproducing beam or to perform the pen-tip recording. Even in this case, it is obvious that the transfer (or magnified transfer) reproduction of the present invention is effective. Also, in the case of the phase-change WORM recording layer in which the crystallizing time $\tau xw$ is very long as in GeTe, it is possible to utilize the melting and recrystallization through a method that the moving speed of the recording medium is lowered in the recording stage. In the case of using the dye material, it is desirable for the recording layer to have a thickness of 10 to 200 nm, preferably 40 to 150 nm. In the case of using Te—C, Te—$O_x$, or Te—Pd—$O_x$, it is desirable for the recording layer to have a thickness of 5 to 100 nm. Further, in the case of using GeTe, it is desirable for the recording layer to have a thickness of about 5 to 70 nm.

The situation in the case of using a ROM as the recording layer is as already described in item (5-3). In the case of the ROM, the construction of the recording medium slightly differs from the basic construction of the recording medium of the present invention shown in FIG. 1. This will be described hereinafter in Examples of the present invention with reference to the drawings. Incidentally, the header section generally has a construction similar to that of ROM in also the case of using the phase-change recording layer and the write-once recording layer. It follows that, even in the recordable medium, the medium construction shown in FIG. 1 is formed above the ROM pit train in the header section. Where the header section and the data section differ from each other in the construction of the medium adapted for the transfer (or magnified transfer) reproduction, it is possible to take various measures. For example, it is possible to optimize the construction of the recording medium in the data section, while the transfer (or magnified transfer) reproduction in the header section is optimized by taking suitable measures in the shape of the ROM pit such as the depth and shape in the in-plane direction in the header section. It is also possible to allow the header section and the data section to differ from each other in the reproducing power. Further, it is possible to lower the recording density in the header section, compared with the recording density in the data section, so as to make it possible to ensure a sufficient amplitude of the reproduction signal in the header section without performing the transfer (or magnified transfer) reproduction.

Various methods such as sputtering, evaporation, spin-coating and CVD can be applied in respect of the deposition of the recording layer. It is possible to control the optical constant, the thermal constant, the melting point, the crystallizing temperature and the crystallizing time of the recording layer by the selection of the deposition method and the selection of the deposition conditions in addition to the selection of the material of the recording layer and the thickness. For example, in the case of depositing a chalcogen-based phase-change recording layer by sputtering, it is possible to control the physical constants of the phase-change recording layer by suitably selecting the sputtering gas species, the gas pressure, the sputtering power, the cathode drop voltage, and the positional relationship between the target and the substrate.

(6-3. Separating Layer and Interference Layer):

For each of the first interference layer 12, the separating layer 14, and the second interference layer 16, it is possible to use at least one material or a plurality of materials differing from each other in the optical characteristics (refractive index) selected from the group consisting of an oxide, a nitride, a carbide, a sulfide, a boride and a fluoride. Also, it is possible to stack a layer of a semi-absorptive material formed of Ge, Si, Au, Cu, Ag, Al or an alloy thereof in the layer formed of the oxide, the nitride, the carbide, the sulfide, the boride or the fluoride. In the case of using the semi-absorptive material, it is desirable for the thickness to fall within a range of between 1 nm and 20 nm, preferably between 1 nm and 10 nm.

The first interference layer 12, the separating layer 14 and the second interference layer 16 are required to be capable of imparting the optical response satisfying the transfer (or magnified transfer) reproduction conditions given in Table 1, and to be capable of imparting an appropriate optical response in the recording stage. These requirements are also related to the selection of the heat control layer (reflective layer) described hereinafter.

The transparent interference material used for the separating layer and the interference layer includes at least one compound selected from the group consisting of Al—C, Si—O, Si—N, Si—O—N, Al—N, Al—O—N, Ti—O, Si—C, Zn—O, Zr—O, Ta—O, Ta—O—N, Zn—S, Cr—O, Mo—O, W—O, V—O, Nb—O, Hf—O, In—O, In—Sn—O, Sn—O, B—N, DLC (diamond-like carbon), a-C (amorphous carbon), Ca—F, Mg—F, C—H, C—F (C—H and C—F being the plasma polymerized or sputtered organic films). The hyphen (-) used in the expressions given above implies that the compounds falling within the range of about ±20 at % of the stoichiometric composition are included. The suitable thickness of each of the separating layer and the interference layer is determined not only by the material of the separating layer and the interference layer and the stacked structure but also by the overall optical design and the thermal design including the reproducing layer, the recording layer and the reflecting layer. Concerning the suitable thickness within a practical range, which is also dependent on the operating wavelength, it is desirable for each of the first interference layer and the second interference layer to have a thickness of 0 to 200 nm, preferably about 20 to 100 nm, and for the separating layer to have a thickness of 5 to 200 nm, preferably about 10 to 100 nm.

Various methods such as sputtering, evaporation, spin-coating and CVD can be employed for forming each of the separating layer and the interference layer. It is possible to control the optical constant, the thermal constant, etc., of the separating layer and the interference layer by the selection of the deposition method and by the selection of the deposition conditions in addition to the selection of the material and the thickness. For example, in the case of forming any of the separating layer and the interference layer by sputtering, it is possible to control the physical constants by suitably selecting the sputtering gas species, the gas pressure, the sputtering power, the cathode drop voltage, and the positional relationship between the target and the substrate.

(6-4. Heat Control Layer):

The heat control layer is not absolutely necessary in the present invention like the first interference layer and the second interference layer. However, where the total thickness of the reproducing layer and the recording layer is small so as to permit the light transmission, it is desirable to form the heat control layer in order to improve the light utilization efficiency and to improve the optical response of the entire recording medium. It is also desirable to form the heat control layer in order to control the thermal response of the entire recording medium, particularly, in order to control the cooling rate of the recording layer. The material used for the heat control layer is not particularly limited if it is a metal and an alloy. The material, the thickness and the deposition method of the heat control layer are optimized in accordance with the optical response design and the thermal response design. For improving the light utilization efficiency and for controlling the optical response, it is desirable to select a film material having a high reflectance relative to the operating wavelength. For the heat control layer, it is desirable to use at least one material selected from the group consisting of Au, Ag, Al, Cu and an alloy thereof with respect to the red wavelength (>600 nm), and to use at least one material selected from the group consisting of Al, Ag and an alloy thereof with respect to the blue wavelength (<500 nm). Also, it is desirable to use a metal or an alloy having a relatively high thermal conductivity in order to control the thermal response of the entire recording medium, particularly, cooling rate of the recording layer. It is also possible to use suitably compounds having a high thermal conductivity such as Si—C, Al—N, DLC, and BeO. It is desirable for the thickness of the heat control layer, which should be optimized by the optical response and the thermal response, to be 10 to 300 nm, preferably 50 to 200 nm.

Various methods such as sputtering, evaporation, spin-coating and CVD can be employed for forming the heat control layer. It is possible to control the optical constant, the thermal constant, etc., of the heat control layer by the selection of the deposition method and by the selection of the deposition conditions in addition to the selection of the material and the thickness. For example, in the case of forming the heat control layer by sputtering, it is possible to control the physical constants by suitably selecting the sputtering gas species, the gas pressure, the sputtering power, the cathode drop voltage, and the positional relationship between the target and the substrate.

Figure 16:
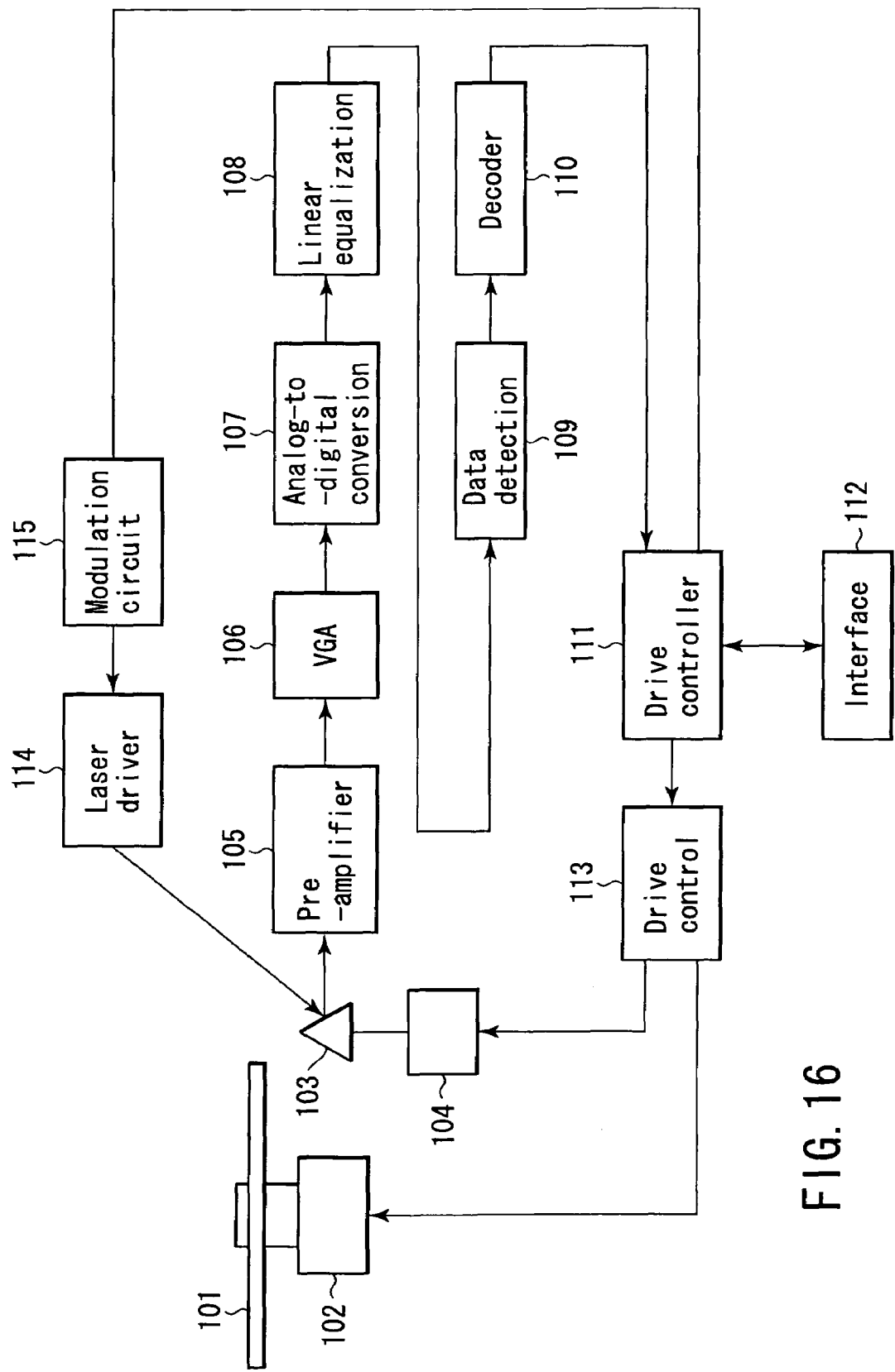
FIG. 16 is a block diagram exemplifying the construction of an optical recording-reproducing apparatus according to an embodiment of the present invention.

(7) Basic Construction and Features of the Optical Recording-reproducing Apparatus of the Present Invention:

FIG. 16 is a block diagram showing the construction of the optical recording-reproducing apparatus according to an embodiment of the present invention. As shown in the drawing, the optical recording-reproducing apparatus of the present invention comprises optical recording medium 101 of the present invention, a spindle motor 102, a pickup head 103, a voice coil motor 104, a pre-amplifier 105, a variable gain amplifier (VGA) 106, an analog-to-digital converting circuit 107, a linear equalizing circuit 108, a data detecting circuit 109, a decoder 110, a drive controller 111, an interface 112, a mechanical drive control circuit 113, a laser driver 114, and a modulation circuit 115.

The optical recording medium 101 has a construction basically equal to that shown in FIG. 1. In the case of using a substrate having a thickness of 1.2 mm, a protective coating is formed on the heat control layer. In the case of using a substrate having a thickness of 0.6 mm, a counter substrate having a thickness of 0.6 mm is attached to the heat control layer with an adhesive layer interposed therebetween. It is possible for the counter substrate noted above to have a film structure similar to that shown in FIG. 1 or to be only a substrate. In the case of using a substrate having a thickness of 1.1 mm, a film stacked in the opposite order to that shown in FIG. 1 is formed on the substrate, followed by attaching a cover layer on the light incident side having a thickness of, for example, 0.1 mm to the stacked film.

It is possible to perform recording and reproduction using the optical recording-reproducing apparatus shown in FIG. 16 by, for example, the procedure given below. The medium 101 mounted in a recording apparatus is rotated at a prescribed rotating speed by the spindle motor 102. The recording medium 101 is irradiated with the light emitted from the light source (practically, a semiconductor laser) housed within the pickup head 103 so as to perform reproduction or recording-reproduction.

For performing the reproducing operation, the reflected light from the medium is guided into the pickup head 103 and is converted into an electrical signal by the light-detecting element housed in the pickup head 103, and then the electric signal is transmitted through the pre-amplifier 105, the variable gain amplifier 106, the A/D converting circuit 107, the linear equalizing circuit 108, the date detecting circuit 109, and the decoder 110. The pre-amplifier 105 and the variable gain amplifier 106 serve to amplify the output signal of the light detector. The A/D converting circuit 107 serves to convert the amplified signal into a digital signal representing a quantized sampling value in a discrete time. The linear equalizing circuit 108 is a type of the digital filter. The date detecting circuit 109 is a signal processing circuit for performing the estimation by the maximum likelihood (ML) for detecting the data from the wave form of the reproduction signal equalized by, for example, partial response (PR). To be more specific, the data detecting circuit 109 is formed of a Viterbi decoder. The decoder 110 serves to restore the encoded bit train detected by the data detecting circuit 109 to the original recording data.

The driving of each of the spindle motor 102 and the voice coil motor 104 is controlled by the drive controller 111 via the drive control circuit 113.

The data recording means comprises the modulation circuit 115, the laser driver 114, and the pickup head 103. The modulation circuit 115 executes encoding operation for converting the recording data forwarded from the drive controller into a prescribed encoded bit train. The laser driver 114 serves to drive the pickup head 103 such that the mark and the space conforming with the encoded bit train generated from the modulation circuit 115 are recorded on the recording medium 101. Incidentally, in the case of using ROM as the recording layer included in the medium, it is not absolutely necessary to mount the data recording means. In other words, it is possible for the apparatus to be provided with the data reproducing means alone, i.e., to be an optical reproducing apparatus.

The drive controller 111, which is a main control system of the recording-reproducing apparatus, is connected to, for example, a personal computer or AV equipment via the interface 112 so as to control the transfer of the recording-reproducing data. An error detecting and correcting circuit is included in the optical recording-reproducing apparatus, though the error detecting and correcting circuit is not shown in FIG. 16. The error detecting and correcting circuit serves to correct the error in the data demodulated by a moving image compression circuit, a moving image expansion circuit, and the data detecting circuit 109 required in the recording-reproducing stage of a video information. Where the recording medium 101 is capable of recording and erasing the data, the erasing beam for erasing the recorded data is formed in the modulation circuit 115. For example, in the case of using a phase-change recording layer as the recording layer of the optical recording medium, an erasing beam having an erasing power level (Pe) lower than the recording power level (Pw) is generated in a DC manner or a pulsed manner.

The basic construction of the optical recording-reproducing apparatus of the present invention, which is similar to the basic construction of the conventional optical recording-reproducing apparatus, has several features peculiar to the present invention. Some of the features of the apparatus are related to the write strategy. Such being the situation, a write strategy is exemplified with reference to FIG. 17.

Figure 17:
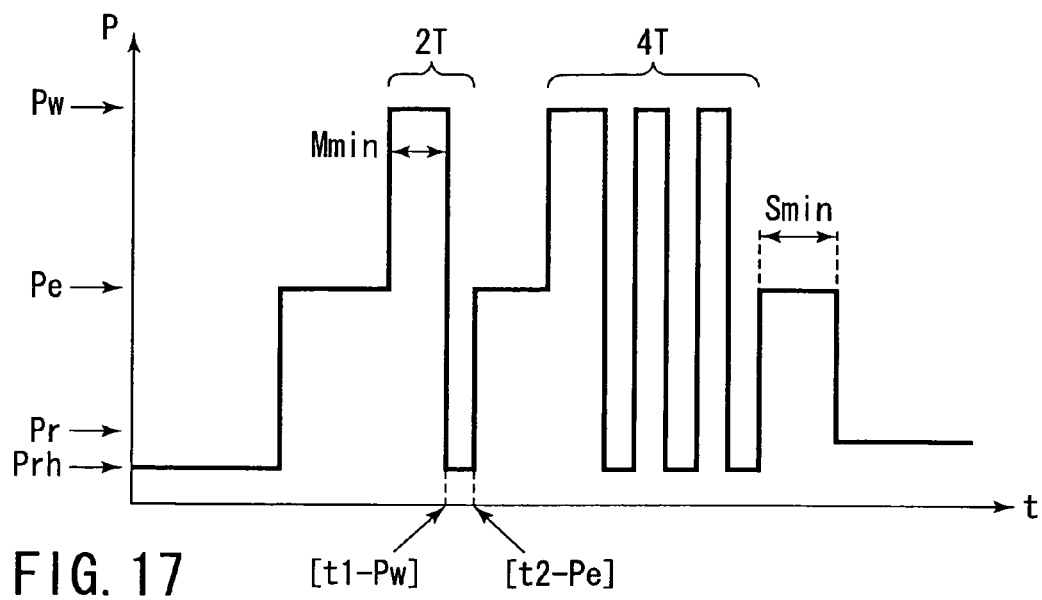
FIG. 17 exemplifies a light irradiation strategy by an optical recording-reproducing apparatus according to an embodiment of the present invention.

In the graph of FIG. 17, the irradiating power is plotted on the ordinate, and the time is plotted on the abscissa. The irradiating power level plotted on the ordinate includes a recording power level Pw, an erasing power level Pe, a data reproducing level Pr and a header reproducing level Prh. The modulating scheme is not particularly limited in the present invention. FIG. 17 shows an example of recording a 2T mark and a 4T mark where the shortest mark length is 2T such as in 1-7RLL or 1-9RLL. Here, "T" denotes the shortest period for operating the system, i.e., the clock period. As exemplified in FIG. 17, the irradiation interval Pw in recording the shortest mark is defined as Mmin and the irradiation interval Pe in recording the shortest space is defined as Smin. Also, in FIG. 17, the time denoted by [t1-Pw] and [t2-Pe] corresponds to the time required for bringing about the states shown in FIGS. 14 and 15 referred to previously. In the case of using the phase-change recording layer, Pw corresponds to the level to form an amorphous mark, and Pe corresponds to the level to form a crystalline space.

A first feature of the optical recording-reproducing apparatus of the present invention is that the level of the data reproducing power Pr is controlled to permit the phase-change reproducing layer to be heated to the melting point or to a temperature higher than the crystallizing temperature such that the mark or the space of the recording layer is transferred to the phase-change reproducing layer and the transfer portion is reproduced.

As known to the art, it is impossible to achieve the temperature elevation with the Pr level to the temperature at which the phase-change is brought about in the phase-change film in the phase-change recording apparatus available on the market. On the other hand, it is known to the art that, in the proposal of the super-resolution technology, used is a Pr level for elevating the temperature of the heat mode super-resolution film to the phase-change temperature, or used is a Pr level corresponding to the number of photons that brings about an optical change in the photon mode super-resolution film. However, in the super-resolution reproduction technology, the phase-change or the optical change continues to be brought about in the super-resolution film at the Pr level.

On the other hand, in the present invention, phase-change is brought about at the Pr level in a part of the reproducing layer corresponding to any one of the mark and the space of the recording layer. The optical recording medium of the present invention markedly differs from the conventional super-resolution medium in this point.

A second feature of the optical recording-reproducing apparatus of the present invention resides in that a train of the recording marks having a size smaller than the optical resolution limit, which is determined by the wavelength and the numerical aperture of the objective lens, is formed by irradiation with the recording light. The particular second feature permits further clarifying the effect brought about by the first feature. The second feature is as already described in detail under the paragraph of the recording principle. It is certainly possible to form the mark and the space of the size smaller than the optical resolution limit of the recording beam even in the recording medium that does not include a phase-change reproducing layer. However, it is impossible to achieve reproduction by means of the light irradiation in such a medium.

A third feature of the optical recording-reproducing apparatus of the present invention resides in that the apparatus comprises the means for restoring the transfer portion of the reproducing layer after irradiation with the reproducing light to the state before the transfer. As described previously, it is possible to achieve the restoration by irradiation with a restoring light beam differing from the recording-reproducing beam or with the light beam equal to the recording-reproducing beam. However, it is most desirable to use a means that controls the passing time of the reproducing beam (linear velocity) so as to restore the state immediately after passage of the reproducing beam. Also, in the strategy in FIG. 17, it is depicted that Pr or Prh irradiation is performed in a DC manner. However, if the light irradiation is performed in a pulsed manner also in the read stage and the strategy is optimized, the restoration of the phase-change reproducing layer after the transfer is facilitated.

A fourth feature of the optical recording-reproducing apparatus of the present invention resides in that, where the optical recording layer of the optical recording medium is formed of a phase-change recording layer or a write-once recording layer, the reproducing power for the header section and the reproducing power for the data section are set at different levels. This is the feature for coping with the situation that the transfer (or magnified transfer) reproduction conditions in the data section do not necessarily coincide with those of the header section in the case where a recordable recording layer is applied to the present invention. As exemplified in FIG. 17, it is possible to achieve easily appropriate transfer (or magnified transfer) reproduction in each of the data section and the header section by allowing Pr and Prh to be different from each other. Also, if read strategy is applied to at least one of Pr and Prh, the optimization of the magnified transfer reproduction can be further facilitated in both of the header section and the data section.

A fifth feature of the optical recording-reproducing apparatus of the present invention resides in that the modulating scheme and the write strategy are set to permit the shortest mark length to be longer than the shortest space length or to permit the shortest mark length to be shorter than the shortest space length, in the recording stage. For example, in the case of using the recording medium of the typical example of No. 1 shown in Table 1, the shortest mark length is set shorter than the shortest space length. As already described in detail under paragraph (3) directed to the principle of magnified transfer reproduction, the setting is particularly effective in the magnifying process. When it comes to the strategy shown in FIG. 17, it corresponds to the situation that Mmin is set shorter than Smin and thus the shortest mark length is recorded in the recording layer substantially shorter than the shortest space length. In the embodiments that the temperature in that portion of the reproducing layer corresponding to the mark is selectively elevated as in the recording medium for Nos. 1, 3 and 5 shown in Table 1, it is useful to record the shortest mark length in the recording layer substantially shorter than the shortest space length. On the other hand, in the embodiments that the temperature in that portion of the reproducing layer corresponding to the space is selectively elevated as in Nos. 2, 4 and 6 shown in Table 1, it is useful to set the shortest mark length longer than the shortest space length.

Further, a sixth feature of the optical recording-reproducing apparatus of the present invention is directed to the combination of the second feature and the fifth feature. That is, in recording the mark and the space smaller than the resolution (optical limit), the recording modulation scheme and the write strategy, in which the shortest mark and the shortest space are positively made different in the length as in the fifth feature of the present invention, are employed.

EXAMPLES

Examples of the optical recording medium and the optical recording-reproducing apparatus of the present invention will now be described. The Examples will be described in the order of: (1) a typical example and various modifications of the magnified transfer reproduction from the phase-change recording layer to the phase-change reproducing layer, (2) an example of the magnified transfer reproduction from the write-once recording layer to the phase-change reproducing layer, and (3) an example of the transfer, magnification, and reproduction from the read-only memory to the phase-change reproducing layer.

The testing apparatus for the recording-reproduction used in the Examples will now be described. The basic construction of the recording-reproducing apparatus is substantially equal to that shown in FIG. 16. However, in order to clarify the effect of the present invention, the waveform of the reproduction signal and CNR were examined by connecting an oscilloscope and a spectrum analyzer to the variable gain amplifier 106 shown in FIG. 16. Also, the recording-reproduction experiments were carried out with changing the mark length and the space length while the input data was set to a single frequency. Incidentally, since it is impossible to obtain a semiconductor laser (LD) of a high output with a short wavelength at this stage, a Kr ion laser having a wavelength of 413 nm was used as the light source in the Examples. The NA of the objective lens was set at 0.65. However, it is obvious that the wavelength of the light source and the NA of the objective lens are not limited in the present invention. To be more specific, it is possible to design the optimum recording medium for each wavelength by setting the optical constant of each layer of the stacked structure constituting the recording medium in accordance with the wavelength of the light source. Also, the maximum power of LD of, for example, 405 nm is about 20 mW at this stage. However, since the maximum power of LD for CD having a wavelength of 780 nm, which has already been put to the practical use, is several hundreds of mW, it is considered sufficiently possible in the future to apply LD having a short wavelength and high power to the present invention.

Example 1

In this Example, a phase-change recording layer was used as the recording layer. First of all, described is the result of confirming the principle of the present invention through (1-1) an example of designing optical response of a recording medium having a simple structure. Then, (1-2) the optical design example and the result of evaluation using the recording medium having an improved optical response are described. Further, (1-3) Examples directed to the various modifications shown in Table 1 are described.

(1-1) An Example of Designing Optical Response of a Medium Having a Simple Structure:

First, the results of the optical design relating to the typical example of No. 1 and the modified example of No. 2 are described. Specifically, a recording medium as shown in FIG. 1 was manufactured by using the materials given below:

Substrate 11: polycarbonate substrate;
First interference layer 12: ZnS—SiO$_2$ (ZnS: 80 at %);
Phase-change reproducing layer 13: Ge$_5$(Sb$_{70}$Te$_{30}$)$_{95}$;
Separating layer 14: ZnS—SiO$_2$ (ZnS: 80 at %);
Phase-change optical recording layer 15: GeSbTe (2-2-5 composition);
Second interference layer 16: ZnS—SiO$_2$ (ZnS: 80 at %);
Heat control layer 17: Ag alloy.

An eccentric rotation magnetron sputtering method was employed for forming each of the layers given above. In this sputtering method, Ar was used as the sputtering gas and the gas pressure was set at 0.25 Pa. The sputtering power was set at 1 kW for forming each of the interference layer, the separating layer and the heat control layer, and at 250 W for forming each of the reproducing layer and the recording layer.

The result of the actual measurement using an ellipsometer was used as the optical constant for each layer. The optical constant for each of the phase-change reproducing layer and the recording layer was measured for two cases, i.e., under the amorphous state as deposited and after the crystallization. The optical constant of the reproducing layer under the molten state is required for the strict optical design. However, since the optical constants under the molten state and the amorphous state are, in general, substantially equal to each other, the optical constant under the amorphous state as deposited was used as the optical constant under the molten state in this Example.

Figure 18A:
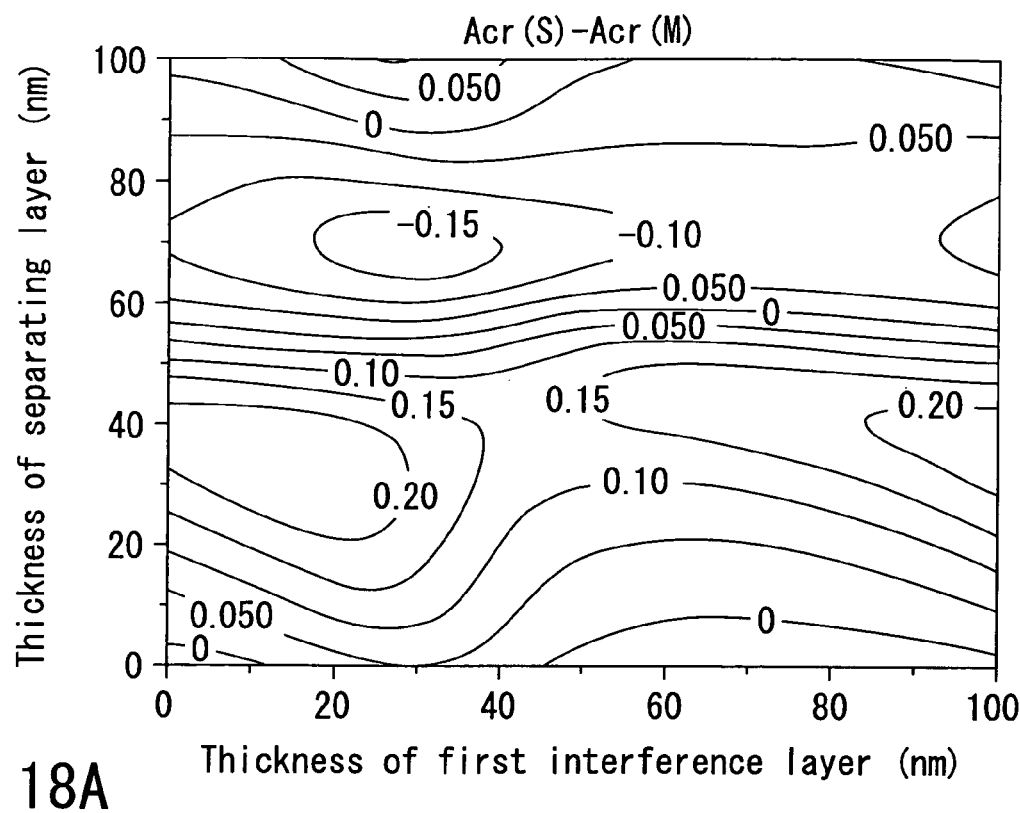
FIGS. 18A and 18B show the absorbance difference before transfer and the reflectance difference after transfer, respectively, of the reproducing layer used in the Examples of the present invention.
Figure 18B:
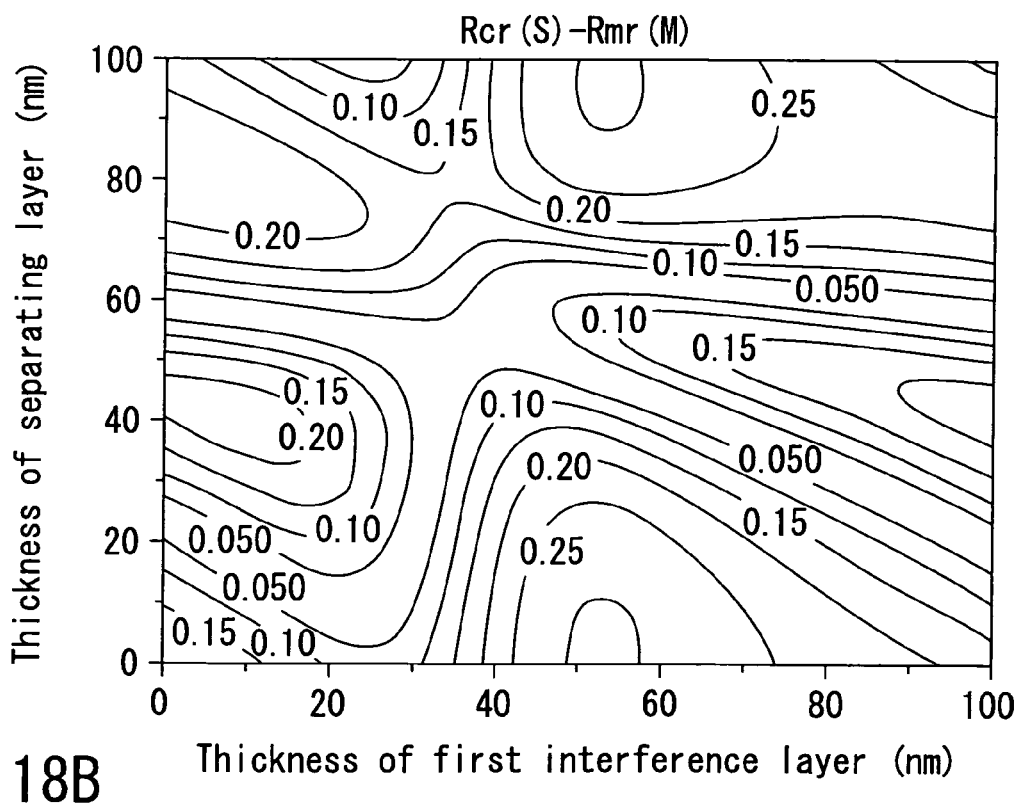

The optical design was performed by setting the thickness of each of the phase-change reproducing layer 13 and the phase-change optical recording layer 15 at 10 nm, the thickness of the second interference layer 16 at 100 nm, and the thickness of the heat control layer 17 at 200 nm, while changing the thickness of each of the first interference layer 12 and the separating layer 14. In terms of the optical design, the thickness of the substrate 11 produces no effect. FIGS. 18A and 18B are graphs showing the results. In the graph of each of FIGS. 18A and 18B, the thickness of the separating layer is plotted on the ordinate, and the thickness of the first interference layer is plotted on the abscissa. FIG. 18A is a contour diagram showing the difference in the absorbance of the reproducing layer before the transfer. FIG. 18B is a contour diagram showing the difference in the reflectance of the reproducing layer after the transfer.

The difference in the absorbance shown in FIG. 18A is represented by Acr(S)–Acr(M) using the symbols defined in Table 1. The numeral on each contour line denotes the difference in the absorbance. With increase in the difference in the absorbance, the difference in the temperature elevation between the mark and the space is increased, indicating that the present invention can be established easily. The negative symbol (−) in FIG. 18A indicates that Acr(M) is higher than Acr(S), i.e., the temperature of the reproducing layer corresponding to the mark of the recording layer is rendered higher than the temperature of the reproducing layer corresponding to the space. This corresponds to the embodiment of typical example of No. 1. The positive symbol in FIG. 18A implies that Acr(M) is lower than Acr(S), i.e., the temperature of the reproducing layer corresponding to the mark of the recording layer is rendered lower than the temperature of the reproducing layer corresponding to the space. This corresponds to the embodiment of the modified example of No. 2. As apparent from FIG. 18A, it is possible to permit the mark to be markedly different from the space in the absorbance of the reproducing layer before transfer even in the simple medium structure in this Example.

The difference in the reflectance shown in FIG. 18B is represented by Rcr(S)–Rmr(M) using the symbols defined in Table 1. As apparent from FIG. 18B, a relatively large value of Rcr(S)–Rmr(M) is obtained within the range of the thickness in which it is possible to obtain a relatively large difference in the absorbance before the transfer in FIG. 18A. This clearly indicates that the basic principle of the present invention is established.

(1-2) Optical response and result of evaluation of a recording medium having an improved structure corresponding to typical example of No. 1:

A recording medium (A) having the basic structure similar to that shown in FIG. 1 and having an improved optical response, compared with the recording medium in item (1-1) given above, was manufactured.

A 0.6 mm-thick polycarbonate disc provided with header sections and tracking grooves was used as the substrate 11. The track pitch was set at 0.34 µm, which is slightly broader than FWHM (0.33 µm) of the light beam, which was formatted for the land-groove recording. The reason why the track pitch was set slightly broader than FWHM is that the recording medium of the present invention, which is highly effective for the cross talk (XT), is incapable of producing a sufficient effect relative to the cross erase (XE) in the recording stage. In the case of using the recording medium of a low XE, it is possible to set the track pitch narrower.

The first interference layer 12 was prepared by stacking a ZnS—$SiO_2$ layer (ZnS: 80 at %) having a thickness of 8 nm, a $TiO_2$ layer having a thickness of 8 nm, and a ZnS—$SiO_2$ layer (ZnS: 80 at %) having a thickness of 5 nm in the order mentioned starting with the substrate side.

The phase-change reproducing layer 13 was formed with a thickness of 25 nm by using a material obtained by adding 20 at % of In and 5 at % of W to $Ge_3(Sb_{70}Te_{30})_{97}$. Indium (In) serves to control the melting point Tmr, and tungsten (W) serves to improve the resistance to the thermal hysteresis. As a result of the DSC measurement, the crystallizing temperature Txr of the phase-change reproducing layer was found to be 100° C. and the melting point was found to be 380° C. Also, the crystallizing rate was estimated experimentally using a static tester. In the static tester, a small piece of a sample is irradiated with a light beam in a pulsed manner so as to estimate the phase-change rate, particularly, the crystallizing rate, with the pulse intensity and pulse time used as parameters. The crystallizing time τxr was found to be about 5 nsec.

The separating layer 14 was prepared by stacking a ZnS—$SiO_2$ layer (ZnS: 80 at %) having a thickness of 15 nm, an $SiO_2$ layer having a thickness of 30 nm, and a ZnS—$SiO_2$ layer (ZnS: 80 at %) having a thickness of 20 nm in the order mentioned starting with the side of the reproducing layer.

The phase-change optical recording layer 15 was formed of a $Ge_{10}(Sb_{70}Te_{30})_{90}$ having a thickness of 10 nm. This recording layer exhibited a crystallizing temperature Txw of 220° C., a melting point Tmw of 600° C. and a crystallizing time τxw of 200 nsec.

The second interference layer 16 was prepared by stacking a ZnS—$SiO_2$ layer (ZnS: 80 at %) having a thickness of 10 nm, an AlN layer having a thickness of 10 nm, and a ZnS—$SiO_2$ layer (ZnS: 80 at %) having a thickness of 50 nm in the order mentioned starting with the side of the reproducing layer.

The heat control layer was formed of an Ag alloy layer having a thickness of 150 nm.

Each of the layers noted above was formed as in the recording medium in item (1-1). In this recording medium, a stacked structure of dielectric layers differing in the refractive index was used for each of the interference layer and the separating layer. The use of the particular stacked structure was intended to achieve the optimum design in respect of the absorbance of each of the reproducing layer and the recording layer and the reflectance of the reproducing layer before and after the transfer as well as to achieve the optimum design in respect of the heat response in recording and reproduction. After deposition, each of the phase-change reproducing layer and the phase-change optical recording layer was subjected to the initial crystallization by using a general bulk initializer.

Typical levels of the power required for formation of an amorphous phase, for the crystallization and for the reproduction were examined in respect of the conventional phase-change recording medium before the experiment on the optical design and on the evaluation of the actual recording medium of the present invention. The examination was intended to estimate the temperatures of the reproducing layer and the recording layer in the reproducing stage and the recording stage so as to prevent degradation in reproduction (local crystallization of the mark in the recording layer during the reproducing operation) from taking place.

The construction of the conventional phase-change recording medium prepared as a control case was as follows. Specifically, a stacked structure comprising:

a first interference layer including a ZnS—SiO$_2$ layer (ZnS: 80 at %) having a thickness of 20 nm, a SiO$_2$ layer having a thickness of 50 nm, an Ag alloy layer having a thickness of 8 nm and a ZnS—SiO$_2$ layer (ZnS: 80 at %) having a thickness of 10 nm;

a recording layer formed of a GeTe rich pseudo-binary GeSbTe and having a thickness of 15 nm;

a second interference layer formed of a ZnS—SiO$_2$ layer (ZnS: 80 at %) having a thickness of 20 nm; and a reflecting layer (which also acts as a heat control layer) formed of a Ag alloy and having a thickness of 200 nm, which were stacked in the order mentioned was formed on a substrate.

The recording layer exhibited a crystallizing temperature Txw of 220° C., a melting point Tmw of 600° C., an absorbance Amw under the amorphous state of 0.5, and an absorbance Asw under the crystalline state of 0.6.

The recording medium thus prepared was evaluated by using an evaluating machine having a wavelength of 413 nm and NA of 0.65 at the linear velocity of 6 m/s so as to examine the optimum power for formation of an amorphous phase, the optimum crystallizing power and the optimum reproducing power. Table 3 shows the result. The optimum power obtained in the experiment is given in the column of "Power" included in Table 3. The values multiplying the optimum power in the experiment by the absorbance is given in the column of "Effective power input". The letter "M" corresponds to the amorphous mark, and "S" corresponds to the crystalline space. It is seen from Table 3 that it is possible to form a mark of the optimum size when the effective power input is 3.5 mW. If the environmental temperature during use of the recording medium is set at the ordinary level of 30° C., the temperature is elevated by "Tmw−30=570° C." when the effective power input is 3.5 mW. In other words, the temperature of the phase-change recording film is elevated by about 163° C./mW of the effective power input. The optical design and the evaluation were performed in respect of the recording medium for Example (1-2), with the above result taken into consideration.

TABLE 3

Example of power used in conventional phase change recording medium

|  | Power (mW) | Effective power input (mW) |
|---|---|---|
| Recording (formation of amorphous phase) | 7 | 3.5 (M), 4.2 (S) |
| Erasure (crystallization) | 4 | 2.4 (M), 2.4 (S) |
| Reproduction | 0.5 | 0.25 (M), 0.3 (S) |

Table 4 shows the optical design of each of the reproducing layer and the recording layer constituting the recording medium for Example (1-2) and the temperatures of the reproducing layer and the recording layer in the reproducing stage and the recording stage. The expression "AM" in Table 4 denotes the absorbance when the recording layer is in an amorphous mark, "AC" denotes the absorbance when the recording layer is in a crystalline space, "RM" denotes the reflectance when the recording layer is in a mark, "RS" denotes the reflectance when the recording layer is in a space, "TM" denotes the temperature when the recording layer is in a mark, and "TS" denotes the temperature when the recording layer is in a space. The marks "M" and "S" in the column of the effective power input correspond to the situation when the recording layer is in a mark and the situation when the recording layer is in a space, respectively. Table 4 shows an example in which the reproducing power (Pr) for the magnified transfer is set at 2.8 mW, the recording power Pw for forming an amorphous phase in the recording layer is set at 35 mW, and the erasing power Pe for crystallizing the recording layer is set at 20 mW.

TABLE 4

Example of absorbance (A) in each layer, the reflectance (R) of reproducing layer and temperature (T) of each layer in optical recording medium of present invention

|  | AM | AS | RM | RS | Effective power input (mW) M | Effective power input (mW) S | TM (° C.) | TS (° C.) |
|---|---|---|---|---|---|---|---|---|
| (4-1) Reproducing process: before transfer, reproducing power (Pr) = 2.8 mW | | | | | | | | |
| Recording layer | 0 | 0.4 | — | — | 0 | 1.12 | 30 | 212 |
| Phase change reproducing layer | Acr (M) 0.8 | Acr (S) 0.4 | Rcr (M) 0.2 | Rcr (S) 0.2 | 2.24 | 1.12 | 395 | 212 |

TABLE 4-continued

Example of absorbance (A) in each layer, the reflectance (R) of reproducing layer and
temperature (T) of each layer in optical recording medium of present invention

| | AM | AS | RM | RS | Effective power input (mW) M | S | TM (° C.) | TS (° C.) |
|---|---|---|---|---|---|---|---|---|
| (4-2) Reproducing process: after transfer, reproducing power (Pr) = 2.8 mW ||||||||
| Recording layer | 0 | 0.4 | — | — | 0.28 | 1.12 | 76 | 212 |
| Phase change | Amr (M) | Acr (S) | Rmr (M) | Rcr (S) | 2.38 | 1.12 | 418 | 212 |
| reproducing layer | 0.85 | 0.4 | 0.05 | 0.2 | | | | |
| (4-3) Recording process: recording power (Pw) = 35 mW ||||||||
| Recording layer | 0.1 | 0.15 | — | — | 3.5 | 5.25 | 600 | 885 |
| Phase change | 0.85 | 0.8 | 0.05 | 0.05 | 29.75 | 28 | (4875) | (4590) |
| reproducing layer | | | | | | | | |
| (4-4) Erasing process: erasing power (Pe) = 20 mW ||||||||
| Recording layer | 0.1 | 0.15 | — | — | 2.0 | 3.0 | 356 | 519 |
| Phase change | 0.85 | 0.8 | 0.05 | 0.05 | 17.0 | 16.0 | (2799) | (2636) |
| reproducing layer | | | | | | | | |

The AM, AS, RM and RS of the reproducing layer correspond to Acr(M), Acr(S), Rcr(M) and Rcr(S), respectively, before the transfer, and to Amr(M), Acr(S), Rmr(M) and Rcr(S), respectively, after the transfer. In table 4, the sum of R of the reproducing layer and A of the recording layer and the reproducing layer is substantially 1 in accordance with the mark (M) and the space (S). It should be noted in this connection that the transmittance (Tr) as the entire recording medium is zero because the recording medium in this Example is of the total reflection type including a reflective layer, and that the amount of the light transmitted to the side of the heat control layer through the reproducing layer (25 nm) and the recording layer (10 nm) is low, though the light is slightly absorbed by the Ag alloy in the heat control layer other than the recording layer and the reproducing layer.

Table 4-1 directed to the state before the transfer indicates that Acr(M) is higher than Acr(S), i.e., Acr(M)>Acr(S), supporting that the transfer condition of the typical example of No. 1 is satisfied. Table 4-1 also shows the state of Rcr(M)~Rcr(S), supporting that the masking condition is satisfied. The effective power input in the reproducing stage is "Pr×A". The values obtained by multiplying the effective power input of "Pr×A" by about 163° C./mW, which is estimated from the experimental data on the conventional recording medium described previously, followed by adding the ambient temperature of 30° C. during use of the recording medium are given as TM and TS, respectively. The value of TM of the reproducing layer given in Table 4-1 indicates that the temperature of the reproducing layer before the transfer in the transfer process exceeded the melting point of 380° C., supporting that the melt transfer takes place in that portion of the recording layer which corresponds to the mark. Also, the value of TM of the recording layer is kept at 30° C., with the result that it is quite impossible for the reproducing degradation to take place. On the other hand, the temperature TS in the space is 212° C., which is lower than Txm of the recording layer and not lower than Txr of the reproducing layer. Since the initial state of the reproducing layer is crystalline in the recording medium for this Example, no problem is generated even if TS of the reproducing layer is not lower than Txr in the reproducing stage.

Then, attention should be paid to the state after the transfer given in Table 4-2. If the transfer takes place, only the reproducing layer in the mark is selectively melted so as to change the optical constant, and the reproducing layer in the space remains unchanged from the state before the transfer. In this case, Amr(M) after the transfer of the reproducing layer exhibits a high value of 0.85 like the state before the transfer. This implies that the molten state is maintained even after the transfer. Because of the situations that Amr(M) differs from Acr(M) before the transfer, and that AM of the recording layer before the transfer differs from that after the transfer, Rmr(M) after the transfer is greatly changed to 0.05 from Rcr(M) before the transfer so as to exhibit a large difference from Rcr(S). This implies that the amplitude of the reproduction signal generated from the transfer portion alone is increased by the transfer. The values of TM and TS after the transfer indicate that the optical recording-reproducing apparatus of the present invention is quite free from the problem of degradation of reproduction and is capable of performing a stable reproducing operation.

The reproducing layer is in the molten state in forming an amorphous mark and in forming a crystalline space in the recording layer in each of the recording process shown in Table 4-3 and the erasing process shown in Table 4-4. It follows that the values of AS and RS in the reproducing layer differ from those in the reproducing stage. The value of each of RM and RS in the recording and erasing stages is about 5%, which is a value sufficient for performing the focusing servo and the tracking servo. As a matter of fact, it was possible to perform the servo without giving rise to any problem in actually performing the evaluation by the evaluating machine. The temperature of the recording layer in the recording stage reached the melting point Tmw in each of the amorphous portion and the crystalline portion, supporting that it was possible to perform the overwrite recording. The temperature of the recording layer in the erasing stage was maintained to fall within a range of between the crystallizing temperature and the melting point in each of the amorphous portion and the crystalline portion, supporting that it was possible to obtain a satisfactory erasure rate. The temperature of the reproducing layer in the recording and erasing stages, which was estimated by the calculation, seems to be elevated to about a level close to the melting point of the material of the reproducing layer. However, since the heat conduction is promoted in proportion to the temperature difference, the temperature of the reproducing layer is not actually promoted to the level shown in Tables 4-3 and 4-4. It is considered reasonable to understand that the molten region of the reproducing layer is expanded in the recording and erasing stages to reach the edge portion of the light beam because of the large temperature difference formed in the reproducing layer in the in-plane direction and the thermal diffusion accompanying the large temperature difference noted above so as to bring about the situation described above. The thermal diffusion in the in-plane direction is also observed in the transfer process shown in each of Tables 4-1 and 4-2. The difference between TM and TS of the reproducing layer brings about the thermal diffusion in the in-plane direction of the reproducing layer, i.e., the magnified transfer reproduction of the present invention.

In the optical recording medium using a super-resolution reproducing layer proposed in the past, the temperature of the super-resolution reproducing layer is considered to be elevated in the recording stage to an extent substantially equal to that in the transfer type phase-change reproducing layer used in the present invention. It is reported that the repeated recording can be performed in the example of the super-resolution recording medium. However, the resistance to the repeated reproduction of the super-resolution reproducing layer is considered to be markedly lower, compared with the present invention, because the recording layer is always under a molten state, under a thermal reaction state or under an optically changed state (in the case of the photon mode) whether or not the recording layer is in a mark or a space. It should be noted in this connection that, in the present invention, that region of the reproducing layer which is melted in the reproducing stage is limited to the portion corresponding to the mark or the space of the recording layer in the embodiments in which the reproducing layer is melted (Nos. 1 and 2 shown in Table 1).

Figure 19:
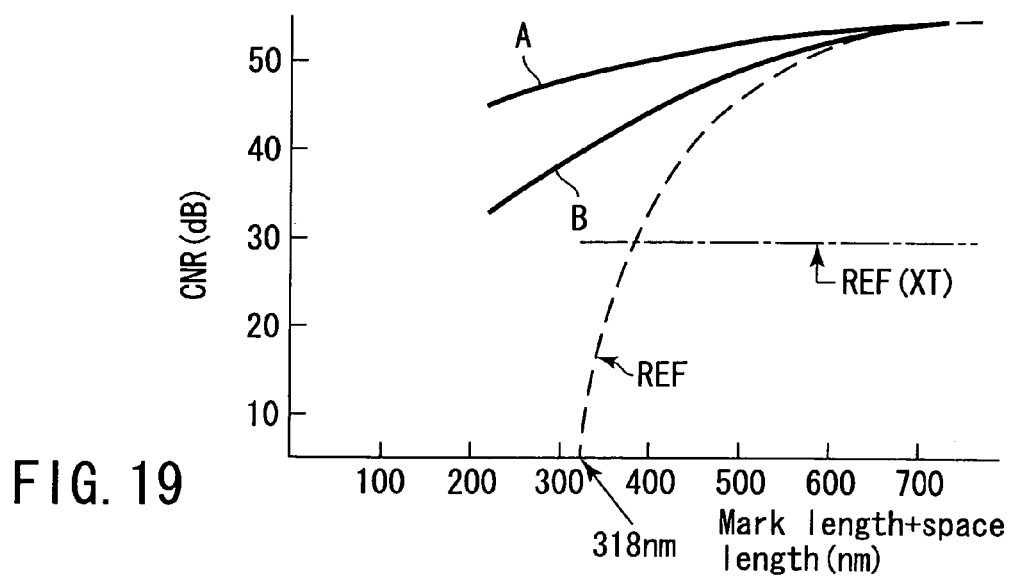
FIG. 19 is a graph showing the relationship between CNR and the sum of the mark length and the space length in the phase-change optical recording medium for Examples of the present invention.

Then, a recording medium for this Example was manufactured on the trial basis, and FIG. 19 is a graph showing the result of the evaluation performed by using an evaluating machine. For clarifying the effect of the transfer reproduction as well as the effect of the magnified transfer reproduction, several recording media differing from each other in the thickness of the reproducing layer were manufactured on the trial basis. The construction and thickness of each of the interference layer and the separating layer were also changed in accordance with the thickness of the reproducing layer so as to control the recording medium to be capable of obtaining the response substantially equal to that shown in Table 4. In performing the evaluation, the linear velocity was set at 6 m/s.

In the graph of FIG. 19, the reproduction signal CNR is plotted on the ordinate, and the sum of the mark length and the space length is plotted on the abscissa. The intensity of the reproduction signal was examined by recording a pattern of a single frequency that was three times as large as the sum of the mark length and the space length plotted on the abscissa of the graph of FIG. 19, followed by performing the recording (mark length~space length) of the single frequency on a track to be recorded and reproduced. A signal differing from that recorded in the recording track was recorded in advance in the adjacent track in order to clarify the effect on the crosstalk (XT).

The curve "REF" shown in FIG. 19 denotes the reproducing characteristics of the ordinary phase-change recording medium. To reiterate, the ordinary phase-change recording medium was prepared by forming a stacked structure comprising a first interference layer including a 20 nm-thick ZnS—$SiO_2$ layer (ZnS: 80 at %), a 50 nm-thick $SiO_2$ layer, a 8 nm-thick Ag alloy layer, and a 10 nm-thick ZnS—$SiO_2$ layer (ZnS: 80 at %); an optical recording layer formed of a 15 nm-thick GeTe rich pseudo-binary GeSbTe layer; a second interference layer formed of a 20 nm-thick ZnS—$SiO_2$ layer (ZnS: 80 at %); and a reflecting layer formed of a 200 nm-thick Ag alloy film, which were stacked in the order mentioned, on a substrate.

In FIG. 19, REF denotes the CNR of the single frequency signal of the mark length/space length plotted on the abscissa and recorded in the recording track, and REF(XT) denotes the CNR of the XT signal from the adjacent track. In the conventional recording medium, the CNR is lowered to substantially zero at the reproduction limit $\lambda/(2\ NA)$ (i.e., 318 nm in this example), and the track pitch (340 nm) is considerably smaller than the eE-2 diameter (500 nm) of the reproducing beam, with the result that the XT is excessively high apparently. Incidentally, if CNR is lowered to about 25 dB or less, the amplitude of the reproduction signal on an oscilloscope was rendered substantially zero. However, it is possible to confirm even on the oscilloscope that the signal can be recorded, if asymmetry is observed. To have the asymmetry matched implies that the reproduction signal is positioned in the level that is substantially in the center between the peak and the bottom of the reproduction signal. If the asymmetry is matched, the system can be established by using the demodulation means such as PRML, even in the case where it is impossible to obtain significant amplitude. However, if the CNR is lower than 20 dB, it is difficult to establish the system even where the asymmetry is matched. It is difficult to determine the lowest CNR that permits establishing the system because the lowest CNR in question is dependent on the demodulation system such as the level of the PRML and the detecting and correcting capability of the error. Then, if the lowest CNR is assumed to be 20 dB, the limit is 350 nm in the conventional recording medium. Also, the value of XT that is considered to permit establishing the system, which is also dependent on the demodulation system, is −30 dB. However, in the conventional recording medium shown in FIG. 19, the difference between CNR of the reproducing track and the leaking CNR from the adjacent track fails to reach −30 dB. It follows that, where the track pitch is 340 nm, the system is not established at all regardless of the values of the mark length and the space length.

Curves A and B shown in FIG. 19 denote the results of the recording-reproduction of the recording medium of the present invention. The curve A denotes the results obtained from the recording medium for this Example. The curve B denotes the results obtained from the recording medium of the present invention, which was designed such that the thickness of the reproducing layer was set at 15 nm, which was smaller than the thickness (25 nm) of the reproducing layer for curve A, and the thickness of each of the other layers was adjusted so as to make it possible to obtain the response substantially equal to that shown in Table 4. The value for the XT signal was substantially 0 dB and, thus, is not shown in the drawing. This is the result that can be sufficiently expected from the transfer reproduction principle of the present invention shown in FIGS. 2 to 5 and from the masking effect shown in Table 4.

The curves A and B shown in FIG. 19 indicate that the reproduction can be achieved with a sufficiently high CNR until the mark length is decreased to 110 nm (i.e., until the sum of the mark length and the space length is decreased to 220 nm). The experimental data was not obtained in the case where the mark length was smaller than 110 nm because it was difficult to form in the recording stage a mark having a length smaller than 110 nm. This can be expected from the recording principle shown in FIG. 15 in view of the crystallizing time τwx of the recording layer, which was 20 nsec, the linear velocity, which was 6 m/s, and the write strategy. To be more specific, M(t1) (~FWHM) shown in FIG. 15 is about 330 nm. Where the linear velocity is 6 m/s, 55 nsec is required for the light beam to pass through the distance of 330 nm. On the other hand, the distance (time×linear velocity) for twx to be made longer than τxw in FIG. 12 is expected to be about 120 nm in the strategy shown in FIG. 17. It follows that, in the linear velocity, the write strategy and τxw in this Example, the limit of the recording mark length is 110 nm. The mark length to be recorded can be further shortened if the recrystallization is facilitated by lowering the linear velocity, by improving the write strategy, or by further shortening τxw.

When the recording medium A including a 25 nm-thick reproducing layer is compared with the recording medium B including a 15 nm-thick reproducing layer, the recording medium A including a relatively thick reproducing layer is superior in the characteristics to the recording medium B. This correctly reflects the effect of the magnified reproduction after the transfer. To be more specific, in the recording medium A including a relatively thick reproducing layer, thermal diffusion is likely to take place easily in the in-plane direction of the reproducing layer. Therefore, it is considered reasonable to understand that the magnification after the transfer is promoted in recording medium A so as to improve the characteristics.

Each of recording medium A and recording medium B was found to be capable of repeated reproduction and repeated recording by the same recording-reproducing beam without using an auxiliary restoring light beam. The capability of the repeated reproduction implies that it was possible to realize the restoration of the reproducing layer after the transfer reproduction. This is because the crystallizing time τxr (5 nsec), the read strategy (DC read in this Example) and the linear velocity in this Example satisfy the conditions required for perfectly realizing the recrystallization after the transfer reproduction (the transfer by the formation of the amorphous phase in the reproducing layer in this Example). It seems difficult to achieve the repeated recording in view of the estimated temperature of the reproducing layer in the recording stage shown in Table 4. However, the estimated temperature shown in Table 4 is no more than the result obtained by calculation of the result of the experiment of the REF recording medium by simply multiplying the recording and erasing power by the absorbance of the reproducing layer (effective power input). Since the thermal diffusion is promoted from the reproducing layer in the in-plane direction and the thickness direction in the actual case in the recording stage, the temperature of the reproducing layer in the recording stage is considerably lower than that shown in Table 4 (for example, only about 1,000° C. in terms of the highest temperature.) Such being the situation, it is possible to achieve the repeated recording.

Next, the recording strategy was adjusted by using the recording medium A that exhibited a prominent magnified reproduction after the transfer so as to examine the case where the shortest mark length was set shorter than the shortest space length. When it comes to the result shown in FIG. 19, there was no problem in the transfer of the adjacent mark accompanying the magnification even if the shortest mark length was substantially equal to the shortest space length. This is because the melting point Tmr of the recording medium A was set at the temperature corresponding to Tmr1 in the magnified transfer reproduction principle shown in FIGS. 8 and 9.

Where the reproducing power (Pr) is increased or the melting point of the reproducing layer is lowered, the magnified transfer of the adjacent mark is brought about in the magnified reproduction stage as shown in FIG. 11 so as to lower the signal amplitude and CNR. Actually, where the reproducing power Pr was increased from 2.8 mW referred to above to 3.5 mW, the amplitude and CNR were slightly lowered. It should be noted that, even in the case where the reproducing power Pr was set at 3.5 mW (Pr=3.5 mW), there was no problem in terms of the degradation of the reproduction because the temperature in the amorphous mark portion of the recording layer was kept lower than the Txw. Even in the case of the reproduction at 3.5 mW, it was possible to obtain the signal amplitude and CNR substantially equal to those in the case of the reproduction at 2.8 mW as a result of employment of the write strategy in which the space length was increased to a level about 1.2 times as much as the mark length (adjustment of Mmin and Smin shown in FIG. 17). It follows that the particular situation, which is somewhat disadvantageous in terms of the recording density compared with the Example described previously in the case where the mark length is the same, is advantageous in expanding the reproducing power margin. In this fashion, the effect produced by the change of the shortest mark length and the shortest space length was demonstrated. The description given above covers the case where the reproducing power Pr was changed. However, it is obvious that the similar effect can be obtained even in the case where the melting point Tmr of the reproducing layer is lowered.

A detailed description has been given above in respect of the optical recording medium for the typical example (No. 1 shown in Table 1) of the present invention including a phase-change recording layer and performing the magnified transfer reproduction, and a recording-reproducing method using the optical recording-reproducing apparatus of the present invention.

(1-3) Examples of Various Modifications in the Case of Using a Phase-change Recording Layer:

The modifications shown in Table 1 (Nos. 2 to 6) will now be described.

Modified Example No. 2

As shown in Table 1, the modified Example No. 2 is in a reversed relationship to the typical Example No. 1 in the transfer. That is, the absorbance of the reproducing layer corresponding to the space of the recording layer is set at a high value in the modified Example No. 2 so as to permit that portion of the reproducing layer which corresponds to the space to be selectively melted. As already described in Example (1-1) with reference to FIG. 18, it can be seen that the embodiment of the modified Example No. 2 can be realized easily because the design that permits Acr(S)–Acr(M) to be positive (+) is established.

To be more specific, it may be advisable to prepare a recording medium substantially equal to the recording medium for Example (1-2) in the first interference layer 12, the reproducing layer 13, the optical recording layer 15, the second interference layer 16, and the heat control layer 17 and having the separating layer 14 obtained by successively stacking a 5 nm-thick ZnS—SiO$_2$ layer (ZnS: 80 at %), a 20 nm-thick SiO$_2$ layer, and a 5 nm-thick ZnS—SiO$_2$ layer (ZnS: 80 at %) in the order mentioned on the side of the reproducing layer. In this recording medium, it is possible to substantially reverse AM and AS shown in Table 4. In this case, the temperature of the recording mark in the reproducing stage, which is higher than that in the recording medium for Example (1-2), is kept lower than Txw and, thus, no problem is generated in terms of the degradation of the reproduction. Also, the effect similar to that shown in FIG. 19 was obtained.

Modified Examples No. 3 and No. 4

The modified Examples No. 3 and No. 4 are directed to the examples in which a coarse crystal is formed in the reproducing layer of the transfer portion. It was possible to work these modified Examples by lowering the reproducing power in the typical Example No. 1 and the modified Example No. 2. However, it is desirable to use a reproducing layer having a large difference in the optical response between the coarse crystal and the initial microcrystal.

As the particular reproducing layer, it is possible to use a reproducing layer equal to that used in the typical Example No. 1, i.e., a reproducing layer prepared by adding 20 at % of In serving to control the melting point Tmr and 5 at % of W for improving the resistance to the thermal hysteresis to $Ge_3(Sb_{70}Te_{30})_{97}$. Also, it is possible to apply all the materials of the phase-change reproducing layer described previously in the item (6). It is also possible to increase the difference in the reflectance between the initial microcrystal and the transferred coarse crystal by the overall optical design including the interference layer, the separating layer and the heat control layer.

If the design similar to that shown in Table 4 is performed with the absorbance set at Ac'r(M) and Ac'r(S) and the reflectance set at Rc'r(M) and Rc'r(S) at the time when the reproducing layer is in the coarse crystalline state, the values corresponding to Amr(M) and Rmr(M) shown in Table 4-2 can be set at: Ac'r(M)=0.78 and Rc'r(M)=0.12. Also, if the layer construction is changed to reflect the relationship between the example of the typical Example No. 1 and the modified Example No. 2, it is possible to set Ac'r(S) and Rc'r(S) shown in Table 4-2 as described above.

It has been clarified that the modified Examples No. 3 and No. 4 are capable of producing the effect of the present invention, though the change in the reflectance after the transfer is small in these modified Examples compared with the case where the reproducing layer after the transfer is modulated into the molten state and the crystalline state as in the typical Example No. 1. In the case of Example (1-2) (typical Example), the reproducing power in the transfer stage was about 2.8 mW. However, it was unnecessary to elevate the temperature of the reproducing layer in the transfer stage to a level not lower than the melting point Tmr and it was possible to achieve the reproduction with a low power. For example, in the case of using a reproducing layer equal to that for Example (1-2), it suffices to elevate the temperature of the reproducing layer in the transfer stage to a level not lower than at least 100° C. because Txr is 100° C. and Tmr is 380° C. For coarsening the crystal, it is desirable to perform the heating to about, for example, 200° C. by referring to FIG. 7. It suffices for the reproducing power required for heating the reproducing layer to 200° C. to be about 1 mW. This Example is desirable in that the reproducing power can be set at a low level so as to make it possible to widen the reproducing power margin, and that it is possible to suppress the degradation of the reproduction. As a result of the recording-reproducing test, it has been found that CNR, which was certainly low compared with FIG. 19, falls in a range within which the system can be established. In addition, it was possible to obtain improvement in the recording density substantially equal to that for the typical Example No. 1 and the modified Example No. 2.

Modified Examples No. 5 and No. 6

The modified Examples No. 5 and No. 6 are directed to the case where the initial state of the phase-change reproducing layer is an amorphous state. In this case, the transfer implies crystallization of a potion of the reproducing layer corresponding to the recording mark (modified Example No. 5), or, conversely, crystallization of the reproducing layer portion corresponding to the recording space (modified Example No. 6). It is possible to initialize the recording medium by using a bulk initializer as in typical Example No. 1 and the modified Examples Nos. 2 to 4. For example, it is possible to apply the means for subjecting each of the recording layer and the reproducing layer to the initial crystallization, followed by selectively forming an amorphous phase in the reproducing layer alone by changing the conditions for the initialization. Also, where the recording layer is arranged on the side close to the substrate as in the recording medium having a cover layer on the light side, it is possible to achieve the initial crystallization in the recording layer after formation of the recording layer or after formation of the separating layer, followed by forming the reproducing layer and leaving the reproducing layer amorphous as deposited.

Since it suffices for the transfer portion to be simply crystallized in the modified Examples No. 5 and NO. 6, it suffices to elevate the temperature to the temperature zone having a high value of Nr in FIG. 7. In the case of using a reproducing layer having Txr substantially equal to that for Example (1-2), it suffices for the temperature of the reproducing layer required for the transfer reproduction to be about 120° C. and for the power to be about 0.5 to 0.6 mW. These Examples are desirable in that it is possible to set the reproducing power at a level further lower than that for the modified Examples No. 3 and No. 4 so as to make it possible to further broaden the reproducing power margin, and that it is possible to suppress the degradation of the reproduction. Also, since the reproducing layer after the transfer is modulated into the amorphous phase and the crystalline phase, it is possible to obtain a reproduction signal having high amplitude as in the typical Example No. 1 and the modified Example No. 2.

However, the portion crystallized by the transfer remains crystallized even after the passage of the reproducing beam and, thus, it is impossible to employ the process of the melting and recrystallization as in the typical Example No. 1 and the modified Example No. 2 or the process of the micro-crystallization after the coarse crystallization as in the modified Examples No. 3 and No. 4. Such being the situation, it is necessary to employ the two rotation operation for restoring the reproducing layer to the initial amorphous state or to employ the reproducing beam differing from the recording-reproducing beam. A recording-reproducing test was conducted such that the reproducing layer was restored to the initial amorphous state by controlling the power of the recording-reproducing beam and the linear velocity in the rotation stage after the transfer reproduction, followed by performing the next reproducing operation. As a result, it was possible to obtain an effect similar to that shown in FIG. 19.

(2) An Example Using a Write-once Recording Layer:

For the write-once recording layer, it is possible to use the materials described previously in the item (6). In this Example, a recording layer formed of a phthalocyanine dye was used. In the case of using the write-once recording layer incapable of erasure, in particular, the dye recording layer for this Example, it is impossible to employ the process of the melting and recrystallization as in the phase-change recording layer for recording the mark smaller than the optical limit of the recording light. Then, the Γ-characteristics were made gentle by using a recording medium in which the heat control layer shown in FIG. 1 was formed of a material having a low thermal conductivity or a recording medium that did not include the heat control layer, and the recording was performed in the rise portion of the Γ-characteristics. The change in the mark and the space relative to the change in the recording power and the change in the ambient temperature is large, compared with the case of using the recording power in the saturated region of the Γ-characteristics, even if the rise of the Γ-characteristics is made gentle. Under the circumstances, an experiment was conducted while controlling the temperature of a recording-reproduction evaluating machine. The reproducing layer used was similar to that used in Example (1-2), and the construction and material of each of the first interference layer, the separating layer and the second interference layer were adjusted in conformity with the optical constant of the recording layer before and after the recording. A heat control layer was not formed in an attempt to make the Γ-characteristics gentle. The thickness of the recording layer was set at 100 nm in order to increase the recording sensitivity and to increase the amplitude of the reproduction signal. It was possible to obtain the optical response characteristics equivalent to those shown in Table 4. According to the result of evaluation, the CNR was found to fall in a range within which the system is established, though the CNR was lower than that shown in FIG. 19. In addition, it was possible to achieve high-density recording and reproduction equivalent to those shown in FIG. 19.

Figure 20:
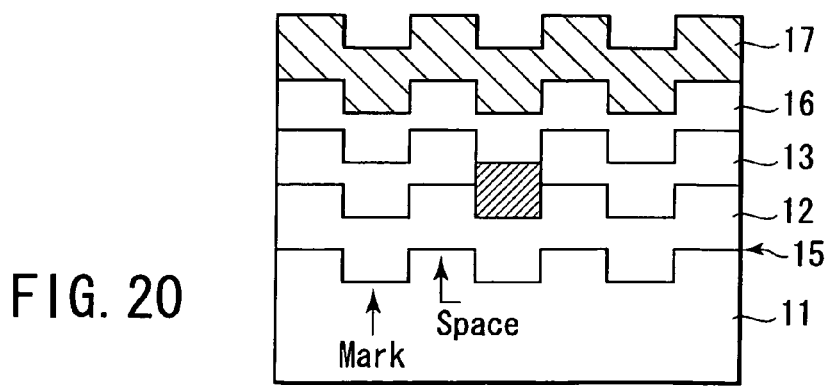
FIG. 20 is a cross-sectional view schematically showing the construction of a ROM medium for Examples of the present invention.

(3) An Example of a ROM:

The construction for application of ROM is similar to the construction for application of the header section of a recordable recording medium. FIG. 20 exemplifies the typical construction of the ROM recording medium. The members shown in FIG. 20, which perform the functions equal to those performed by the members shown in the other drawings, are denoted by the same reference numerals. As shown in FIG. 20, a pre-pit train 15 as a recording mark train is formed on the surface of a ROM substrate 11. Also, a first interference layer 12, a phase-change reproducing layer 13, a second interference layer 16 and a heat control layer 17 are formed in the order mentioned on the surface having a pre-pit train 15 of the substrate 11. The recording medium shown in FIG. 20 differs from that shown in FIG. 1 in that an irregular surface region of the substrate 11 is used instead of the recording layer, and that a separating layer is not included in the recording medium shown in FIG. 20. The recording of information is performed by the formation of a pit train, as a recording mark train, on the surface region of the substrate 11, the pit train can be formed through the ordinary mastering process, the stamper process and the injection process. A pit train of a size smaller than the optical limit of the reproducing beam is formed for prominently producing the effect of the present invention. The particular pit train can be formed by use of deep ultra-violet (DUV) light having a wavelength of 266 nm or an electron beam (EB) in the mastering process. It is not absolutely necessary for the first and second interference layers to be included in the recording medium shown in FIG. 20. However, it is desirable to form the first and second interference layers in order to obtain a suitable optical response in the magnified transfer reproduction for the present invention.

The ordinary ROM is constructed such that a layer having a high reflectance is formed on a substrate having a pit train formed thereon, and reproduction based on a reflectance difference or phase difference is performed by controlling the depth of the pit to about $\lambda/4$. On the other hand, in the case of applying the present invention to ROM, the pit depth is set such that the optical response of the phase-change reproducing layer is rendered appropriate. In the case of ROM according to the present invention, the pit depth falls within a range of between $\lambda/12$ and $\lambda/2$ in the first period. The first period implies that an equivalent optical response can be obtained, if $\lambda/2$ is added to the pit depth noted above.

The phase-change reproducing layer used in this Example is equivalent to that used in Example (1-2) described previously. The pit depth was set at $\lambda/6$, i.e., about 70 nm, and the construction and thickness of the first interference layer, the second interference layer and the heat control layer were adjusted. Tables 5 and 6 show two examples of the optical design. Specifically, Table 5 is directed to the example of utilizing the change in the absorbance of the heat control layer, and Table 6 is directed to the example of utilizing the change in the transmittance of the recording medium. Since the recording mark train is formed of a pit train in the case of ROM, it is impossible to change the absorbance or the reflectance of the recording layer before and after the transfer unlike the recordable recording medium shown in FIG. 1. Such being the situation, prepared were the recording medium directed to the example of utilizing the change in the absorbance of the heat control layer before and after the transfer (Table 5) and the recording medium directed to the example of decreasing the thickness of the heat control layer (to, for example, 50 nm or less, preferably to 25 nm or less) for allowing the entire recording medium to exhibit transmission and to change the transmittance before and after the transfer (Table 6). In addition, it is possible to bring about an optical change before and after the transfer by utilizing the pit train itself. For example, it is possible to arrange a semi-absorptive film in the first interference layer on the pit plane and to change the reflectance, the transmittance and the absorbance of the semi-absorptive film before and after the transfer.

TABLE 5

Example of absorbance (A) for each layer, reflectance (R) of reproducing layer, and temperature (T) for each layer in the optical recording medium (ROM) of present invention:
(Example of utilizing absorbance of heat control layer)

| | AM | AS | RM | RS | Effective power input (mW) | | TM (° C.) | TS (° C.) |
|---|---|---|---|---|---|---|---|---|
| (5-1) Reproducing process: before transfer, reproducing power (Pr) = 4 mW | | | | | | | | |
| Phase change reproducing layer | Acr (M) 0.5 | Acr (S) 0.2 | Rcr (M) 0.3 | Rcr (S) 0.3 | 2.0 | 0.8 | 356 | 160 |
| Heat control layer | 0.2 | 0.5 | — | — | 0.8 | 2.0 | 95 | 193 |
| (5-2) Reproducing process: after transfer, reproducing power (Pr) = 4 mW | | | | | | | | |
| Phase change reproducing layer | Amr (M) 0.65 | Acr (S) 0.2 | Rcr (M) 0 | Rcr(S) 0.3 | 2.6 | 0.8 | 453 | 160 |
| Heat control layer | 0.35 | 0.5 | — | — | 1.4 | 2.0 | 144 | 193 |

TABLE 6

Example of absorbance (A) for each layer, reflectance (R) of reproducing layer, and temperature (T) for each layer in the optical recording medium (ROM) of present invention:
(Example of utilizing transmittance (TR) of recording medium)

| | AM | AS | RM | RS | TrM | Trs | Effective power input (mW) | | TM (° C.) | TS (° C.) |
|---|---|---|---|---|---|---|---|---|---|---|
| (6-1) Reproducing process: before transfer, reproducing power (Pr) = 4 mW | | | | | | | | | | |
| Phase change reproducing layer | 0.65 | 0.2 | 0.05 | 0.4 | — | — | 2.6 | 0.8 | 453 | 160 |
| Medium Transmittance | — | — | — | — | 0.3 | 0.4 | — | — | — | — |
| (6-2) Reproducing process: after transfer, reproducing power (Pr) = 4 mW | | | | | | | | | | |
| Phase change reproducing layer | 0.5 | 0.2 | 0.4 | 0.4 | — | — | 2.0 | 0.8 | 356 | 160 |
| Medium Transmittance | — | — | — | — | 0.1 | 0.4 | — | — | — | — |

As apparent from Tables 5 and 6, the present invention can work even in the case of being applied to a ROM. As a result of the reproducing experiment, it was possible to obtain the effect of increasing the recording-reproducing density equal to that shown in FIG. 19 with CNR higher than that in FIG. 19. Where the mastering is performed with EB, it is possible to perform the reproduction with a sufficient CNR even if the mark (pit) is shorter than that shown in FIG. 19.

In each of the Examples described above, the present invention is applied mainly to a single-layer, single-sided recording medium. However, the present invention is not limited to the single-layer, single-sided structure. It is obvious that the present invention can also be applied to a dual-layer, single-sided recording medium. In the case of the dual-layer, single-sided recording medium, it is desirable for the optimum thickness of each of the absorptive layers such as the phase-change reproducing layer, the recording layer and the heat control layer to be smaller than the value described previously in conjunction with the Examples of the present invention.

Also, a Kr ion laser having a wavelength of 413 nm was used in the Example in which the recording-reproducing experiment was carried out by applying the present invention to a recordable recording medium. However, the wavelength of the light source is not limited in the present invention. The present invention can be worked by conducting an optical design in conformity with the optical constant of each layer included in the recording medium corresponding to the wavelength. Also, in the Example described above, an objective lens having NA of 0.65 was used. However, it is obvious that the present invention is not dependent on the NA of the objective lens. The present invention is also applicable to a near-field recording system such as a solid immersion lens (SIL) recording-reproducing system or a probe recording-reproducing system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical recording medium, comprising:
   an optical recording layer;
   a separating layer formed on a reproducing light incident side of the optical recording layer; and
   a phase-change reproducing layer formed on the reproducing light incident side of the separating layer, absorbance of which phase-change reproducing layer is changed depending on whether a state of the optical recording layer is a recording mark or a space,
   wherein a transfer portion to which a state of the optical recording layer is transferred is formed in a portion having high absorbance of the phase-change reproducing layer by irradiation with reproducing light, while a portion of the phase-change reproducing layer other than the transfer portion is kept in a state optically differing from the transfer portion.

2. The optical recording medium according to claim 1, wherein the transfer portion is magnified as compared with a recording mark in the optical recording layer.

3. The optical recording medium according to claim 1, wherein the optical recording layer is a phase-change optical recording layer.

4. An optical recording medium, comprising:
   an optical recording layer;
   a separating layer formed on a reproducing light incident side of the optical recording layer; and
   a phase-change reproducing layer formed on the reproducing light incident side of the separating layer, absorbance of which phase-change reproducing layer is changed depending on whether a state of the optical recording layer is a recording mark or a space,
   wherein a reverse transfer portion to which a state of the optical recording layer is reversely transferred is formed in a portion having high absorbance of the phase-change reproducing layer by irradiation with reproducing light, while a portion of the reproducing layer other than the reverse transfer portion is kept in a state optically differing from the reverse transfer portion.

5. The optical recording medium according to claim 4, wherein the reverse transfer portion is magnified as compared with a recording mark in the optical recording layer.

6. The optical recording medium according to claim 4, wherein the optical recording layer is a phase-change optical recording layer.

7. An optical recording medium, comprising:
   a transparent substrate having a pit train as an optical recording layer formed on a surface thereof; and
   a phase-change reproducing layer formed on the transparent substrate, absorbance of which phase-change reproducing layer is changed depending on whether a state of the optical recording layer is a recording mark or a space,
   wherein a transfer portion to which a state of the optical recording layer is transferred is formed in a portion having high absorbance of the phase-change reproducing layer by irradiation with reproducing light, while a portion of the phase-change reproducing layer other than the transfer portion is kept in a state optically differing from the transfer portion.

8. The optical recording medium according to claim 7, wherein the transfer portion is magnified as compared with a recording mark of the surface region of the transparent substrate.

9. An optical recording medium, comprising:
   a transparent substrate having a pit train as an optical recording layer formed on a surface thereof; and
   a phase-change reproducing layer formed on the transparent substrate, absorbance of which phase-change reproducing layer is changed depending on whether a state of the optical recording layer is a recording mark or a space,
   wherein a reverse transfer portion to which a state of the optical recording layer is reversely transferred is formed in a portion having high absorbance of the phase-change reproducing layer by irradiation with reproducing light, while a portion of the reproducing layer other than the reverse transfer portion is kept in a state optically differing from the reverse transfer portion.

10. The optical recording medium according to claim 9, wherein the reverse transfer portion is magnified as compared with a recording mark of the surface region of the transparent substrate.

11. An optical recording-reproducing method, comprising:
    irradiating the optical recording medium according to claim 1 with reproducing light;
    transferring a recording mark or a space of the recording layer to the phase-change reproducing layer heated to a temperature not lower than a melting point or a crystallizing temperature by irradiation with the reproducing light to form a transfer portion; and
    detecting reflected light from the transfer portion to perform reproduction.

12. The method according to claim 11, further comprising:
    irradiating the optical recording medium with recording light; and
    forming in the recording layer a train of recording marks each having a size smaller than optical resolution determined by a wavelength and a numerical aperture of an objective lens.

13. The method according to claim 11, further comprising: restoring the reproducing layer having the transfer portion formed by irradiation with the reproducing light to a state before the transfer.

14. The method according to claim 11,
    wherein the optical recording medium comprises a substrate having a pit train as a header section formed on a surface thereof and the optical recording layer used as a data section is a phase-change recording layer or a write-once recording layer,
    and wherein, when the optical recording medium is reproduced, read power for the header section and read power for the data section are set at different values.

15. The method according to claim 11, wherein a modulation scheme and a write strategy are set such that a shortest mark length is made longer than a shortest space length, or a shortest mark length is made shorter than a shortest space length.

16. An optical recording-reproducing method, comprising:
    irradiating the optical recording medium according to claim 4 with reproducing light;
    reversely transferring a recording mark or a space of the recording layer to the phase-change reproducing layer heated to a temperature not lower than a melting point or a crystallizing temperature by irradiation with the reproducing light to form a reverse transfer portion; and detecting reflected light from the reverse transfer portion to perform reproduction.

17. The method according to claim 16, further comprising:
   irradiating the optical recording medium with recording light; and
   forming in the recording layer a train of recording marks each having a size smaller than optical resolution determined by a wavelength and a numerical aperture of an objective lens.

18. The method according to claim 16, further comprising: restoring the reproducing layer having the reverse transfer portion formed by irradiation with the reproducing light to a state before the transfer.

19. The method according to claim 16,
   wherein the optical recording medium comprises a substrate having a pit train as a header section formed on a surface thereof and the optical recording layer used as a data section is a phase-change recording layer or a write-once recording layer,
   and wherein, when the optical recording medium is reproduced, read power for the header section and read power for the data section are set at different values.

20. The method according to claim 16, wherein a modulation scheme and a write strategy are set such that a shortest mark length is made longer than a shortest space length, or a shortest mark length is made shorter than a shortest space length.

21. An optical recording-reproducing method, comprising:
   irradiating the optical recording medium according to claim 7 with reproducing light;
   transferring a recording mark or a space of the recording layer to the phase-change reproducing layer heated to a temperature not lower than a melting point, or a crystallizing temperature by irradiation with the reproducing light to form a transfer portion; and
   detecting reflected light from the transfer portion to perform reproduction.

22. An optical recording-reproducing method, comprising:
   irradiating the optical recording medium according to claim 9 with reproducing light;
   reversely transferring a recording mark or a space of the recording layer to the phase-change reproducing layer heated to a temperature not lower than a melting point or a crystallizing temperature by irradiation with the reproducing light to form a reverse transfer portion; and
   detecting reflected light from the reverse transfer portion to perform reproduction.

* * * * *